United States Patent
Hirai et al.

(10) Patent No.: US 8,100,775 B2
(45) Date of Patent: Jan. 24, 2012

(54) DRIVING WHEEL BEARING APPARATUS

(75) Inventors: Isao Hirai, Iwata (JP); Kiyotake Shibata, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/959,633

(22) Filed: Dec. 3, 2010

(65) Prior Publication Data

US 2011/0077089 A1    Mar. 31, 2011

Related U.S. Application Data

(63) Continuation of application No. PCT/JP2009/002485, filed on Jun. 3, 2009.

(30) Foreign Application Priority Data

| Jun. 4, 2008 | (JP) | 2008-147034 |
| Jun. 9, 2008 | (JP) | 2008-150492 |
| Aug. 11, 2008 | (JP) | 2008-207117 |
| Aug. 14, 2008 | (JP) | 2008-208856 |

(51) Int. Cl.
*F16D 3/223* (2006.01)

(52) U.S. Cl. ................... 464/178; 403/280

(58) Field of Classification Search .......... 464/178, 464/182, 906; 403/280, 364; 384/544, 589; 301/105.1
See application file for complete search history.

(56) References Cited

U.S. PATENT DOCUMENTS

| 4,893,960 A | 1/1990 | Beier et al. |
| 6,702,472 B2 * | 3/2004 | Sera et al. ............... 384/544 X |
| 6,821,208 B2 * | 11/2004 | Krude et al. ................ 464/178 |
| 6,908,231 B2 * | 6/2005 | Hagiwara ............... 384/544 X |
| 2002/0025093 A1 | 2/2002 | Sahashi et al. |

FOREIGN PATENT DOCUMENTS

| DE | 36 36 243 | 5/1988 |
| DE | 10 2006 032 159 | 1/2008 |
| EP | 1 179 440 | 9/2008 |
| FR | 2 605 557 | 10/1987 |
| GB | 2 199 390 | 7/1988 |
| JP | 63-184501 | 7/1988 |
| JP | 2002-029209 | 1/2002 |
| JP | 2003-118309 | 4/2003 |
| JP | 2004-345370 | 12/2004 |
| JP | 2006-300228 | 11/2006 |
| JP | 2006-347544 | 12/2006 |
| JP | 2007-062647 | 3/2007 |
| JP | 2008-018821 | 1/2008 |
| JP | 2008-018823 | 1/2008 |
| JP | 2008-051180 | 3/2008 |
| JP | 2009-079675 | 4/2009 |
| WO | WO 2006/111146 | 10/2006 |

* cited by examiner

*Primary Examiner* — Gregory Binda
(74) *Attorney, Agent, or Firm* — Harness, Dickey & Pierce, P.L.C.

(57) ABSTRACT

A driving wheel bearing apparatus has an inner ring 5 secured to a wheel hub 1 by a caulked portion 13. An outer joint member 14 of a constant velocity universal joint 3 has a shoulder portion 19 and a cylindrical shaft portion. Face splines 19a and 13a are formed at the end faces of the shoulder portion 19 and the caulked portion 13. Face splines 19a and 13a are supported with pressure by a fastening bolt 21 that abuts the outer side end face of the wheel hub 1 and is threadedly connected to an internal thread 20a of the shaft portion 20. Compressive remaining stress is placed on the surfaces of the face splines 19a and 13a as a result of surface modification, by shot peening. The surface hardness is set at 300 Hv or more.

11 Claims, 26 Drawing Sheets

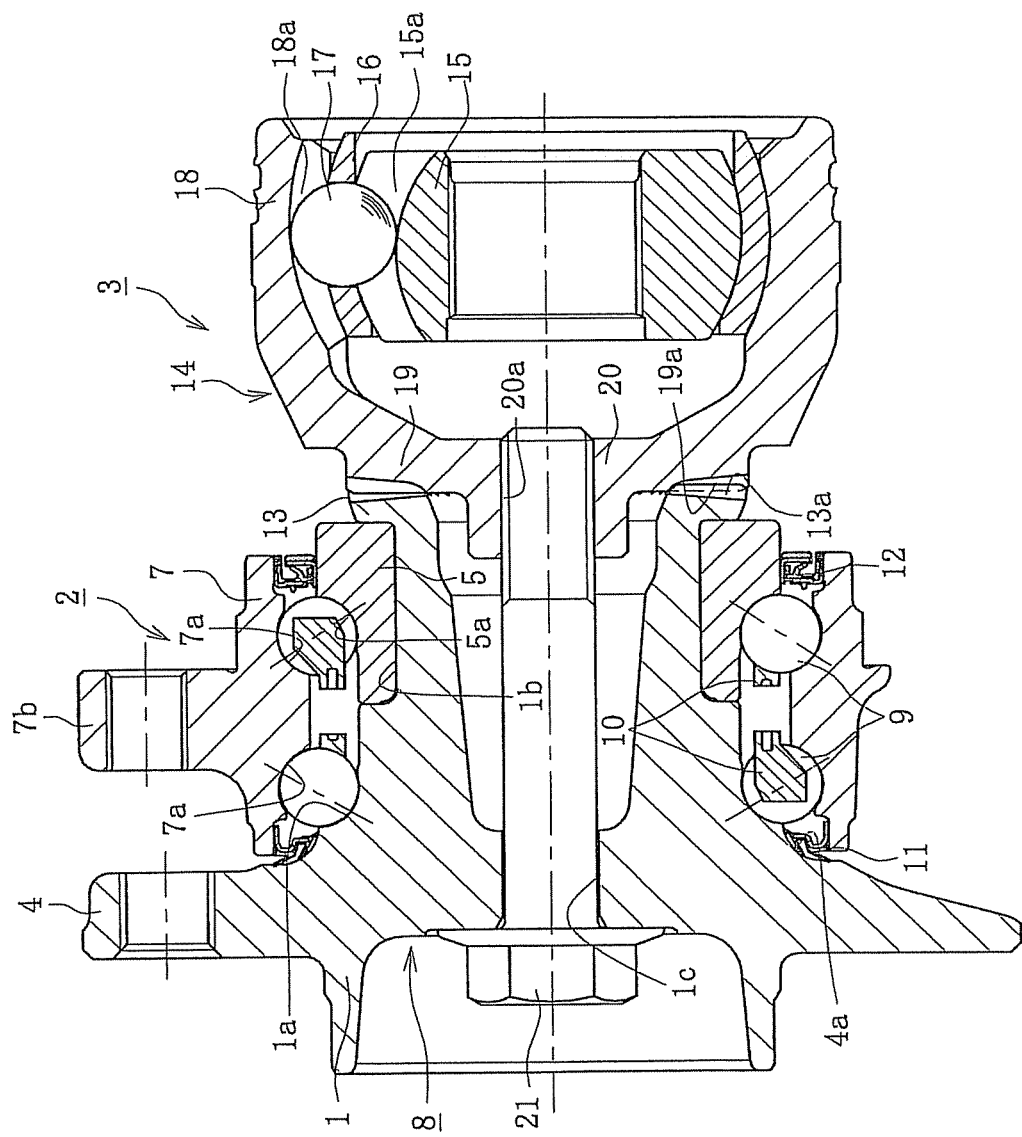
[Fig 1]

[Fig 2]
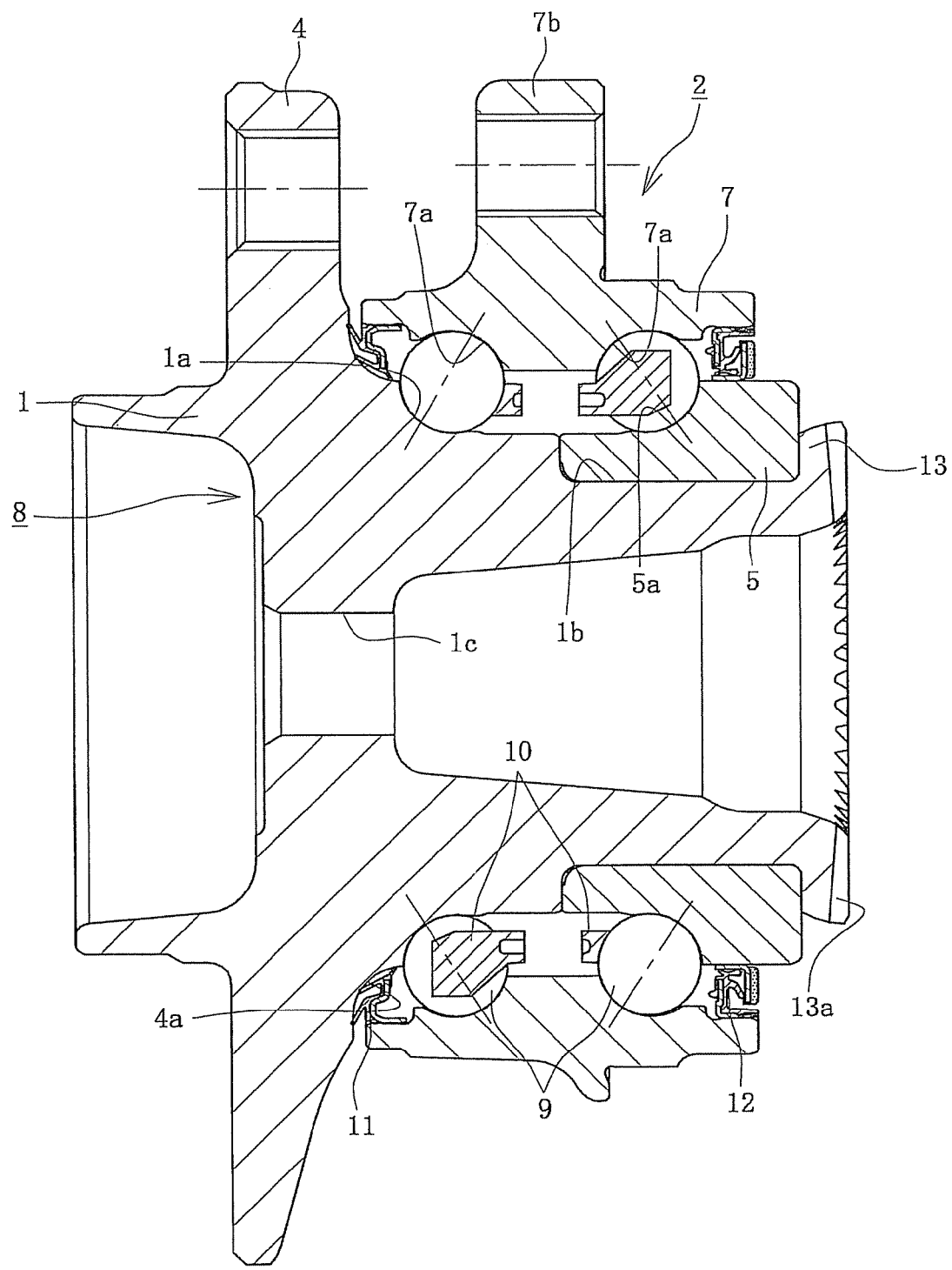

[Fig 3]
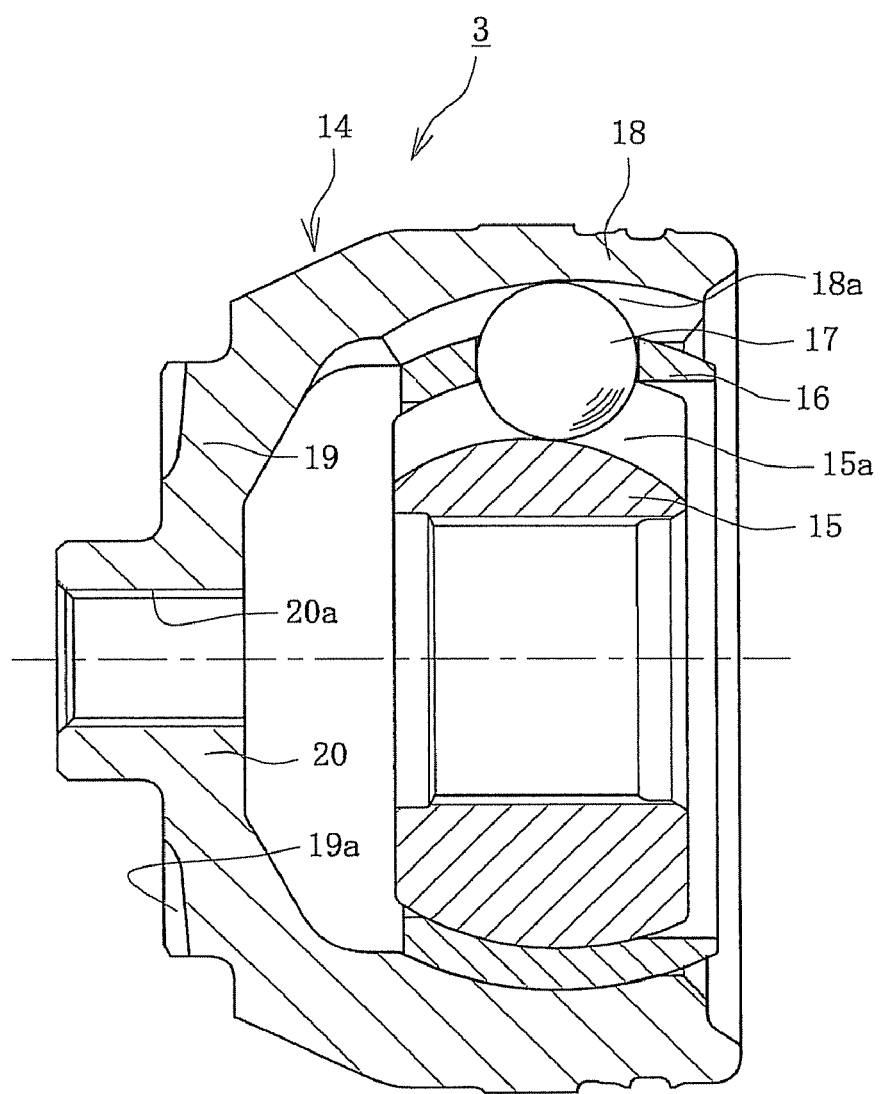

[Fig 4]
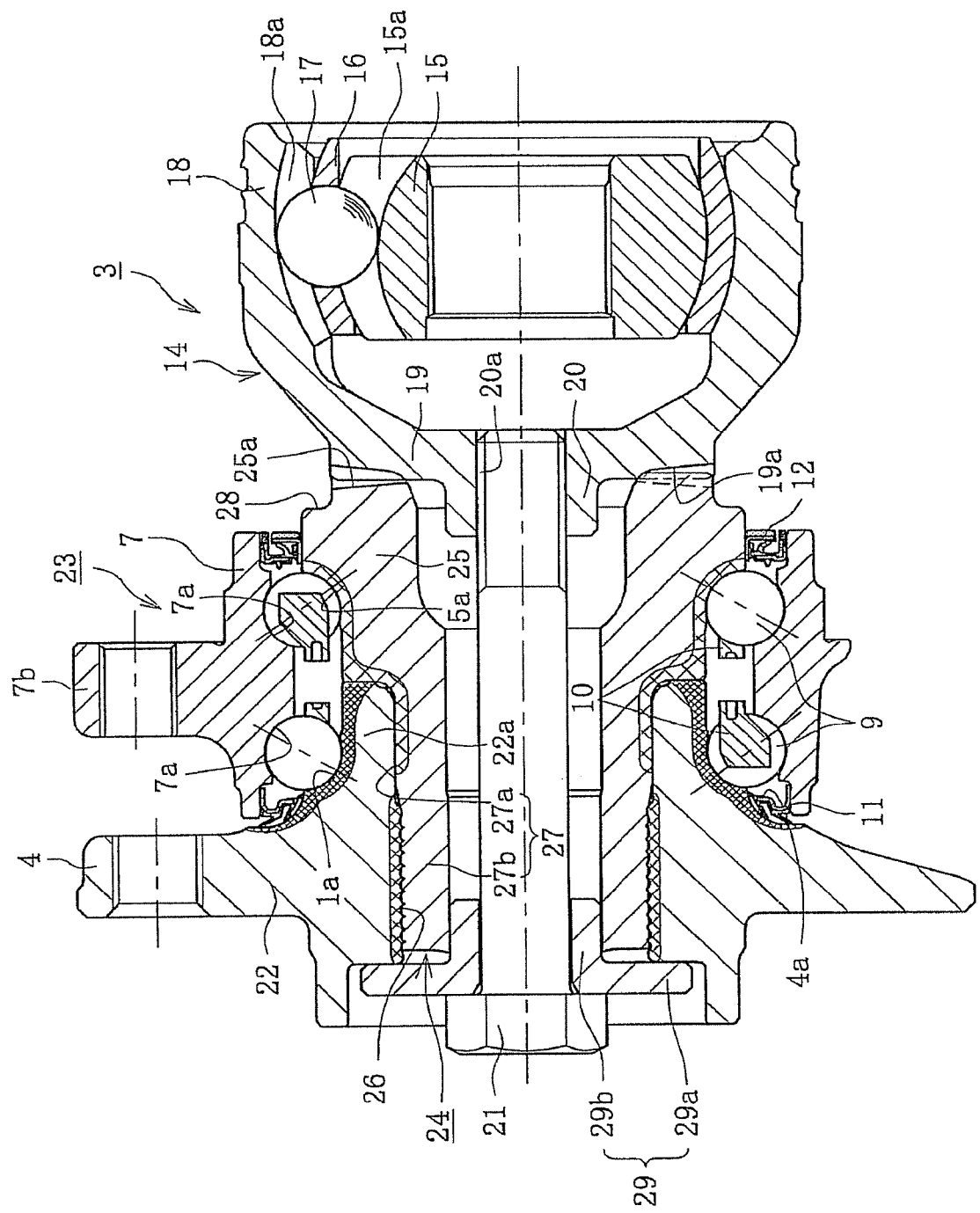

[Fig 5]
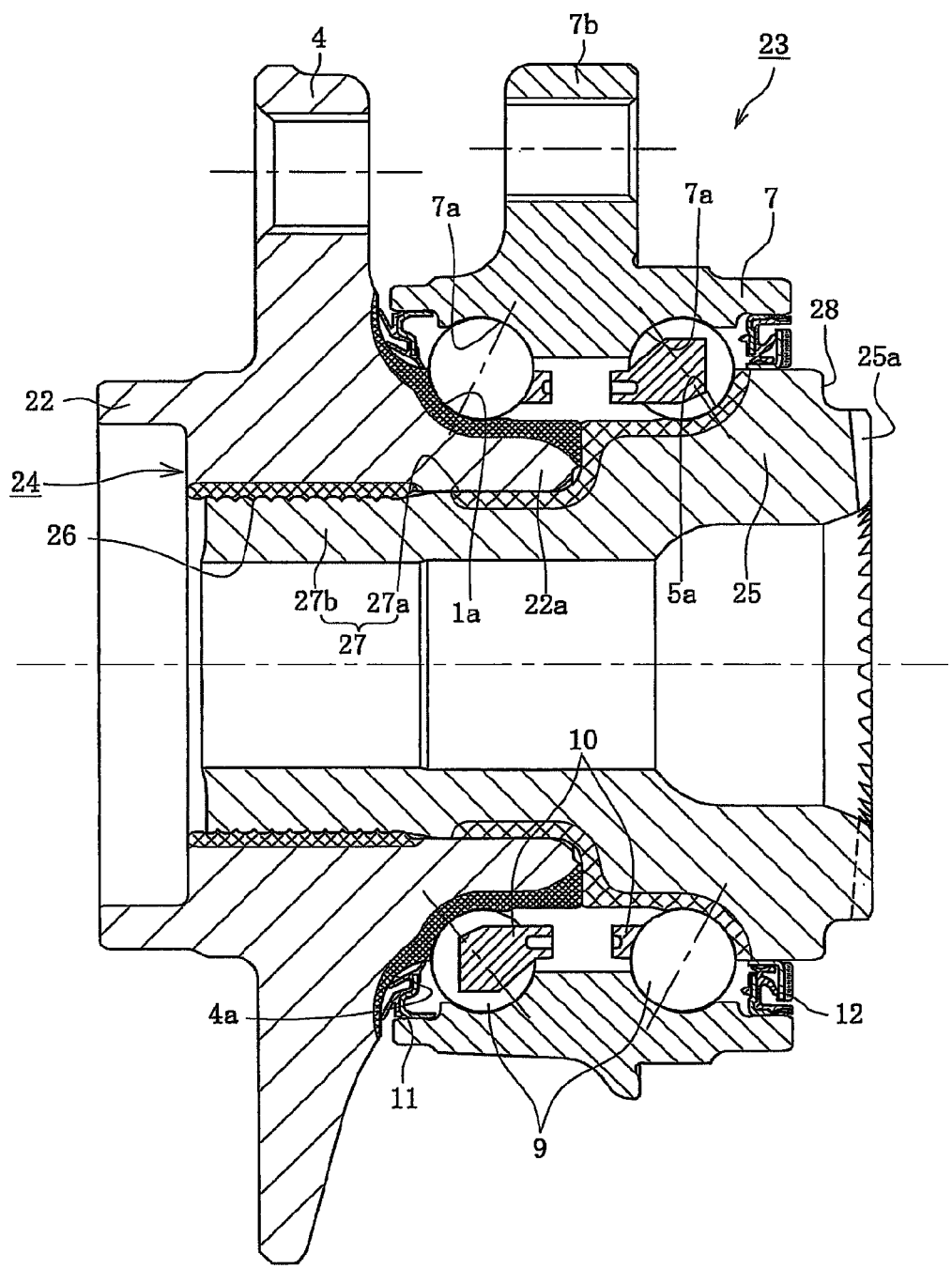

[Fig 6]
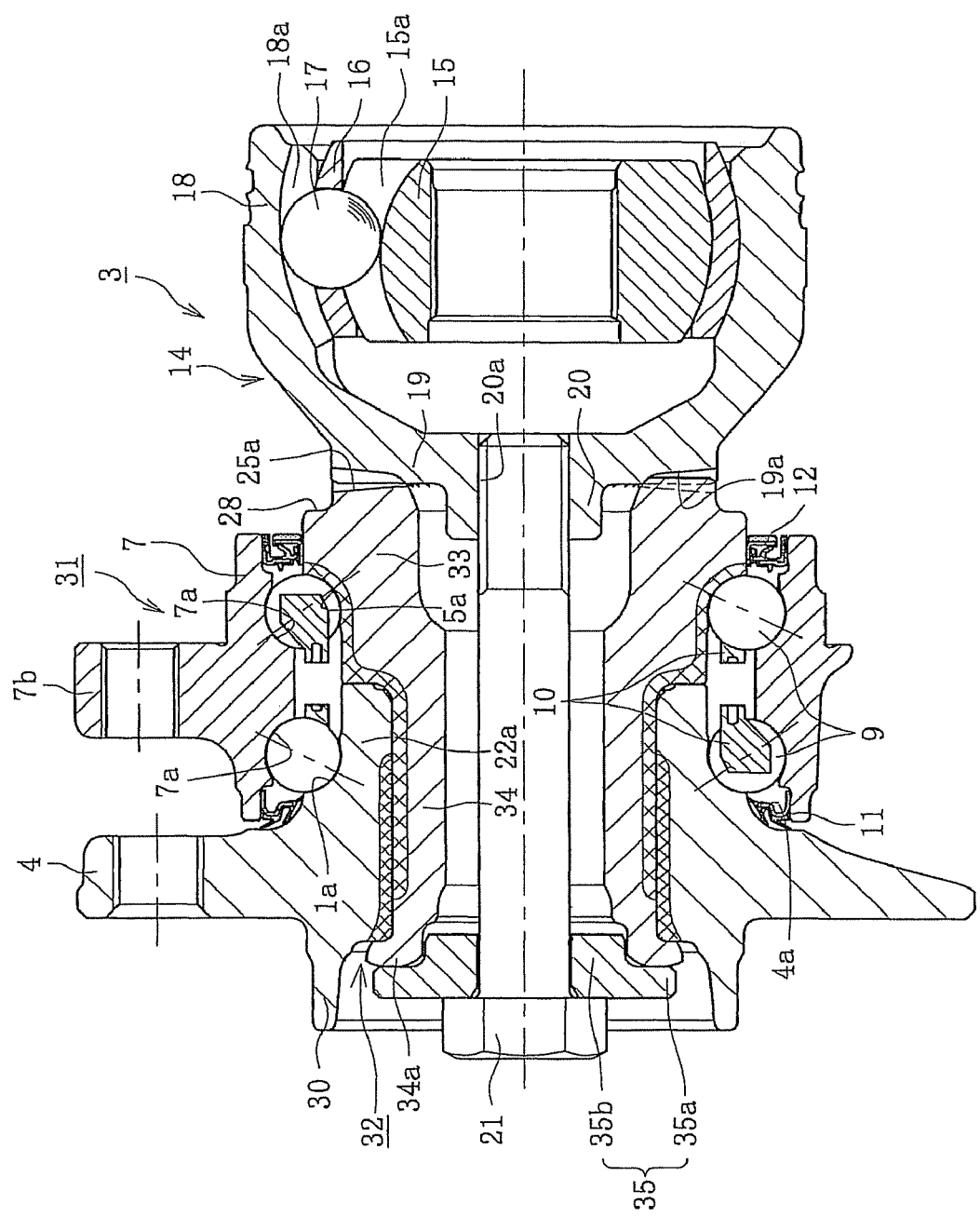

[Fig 7]
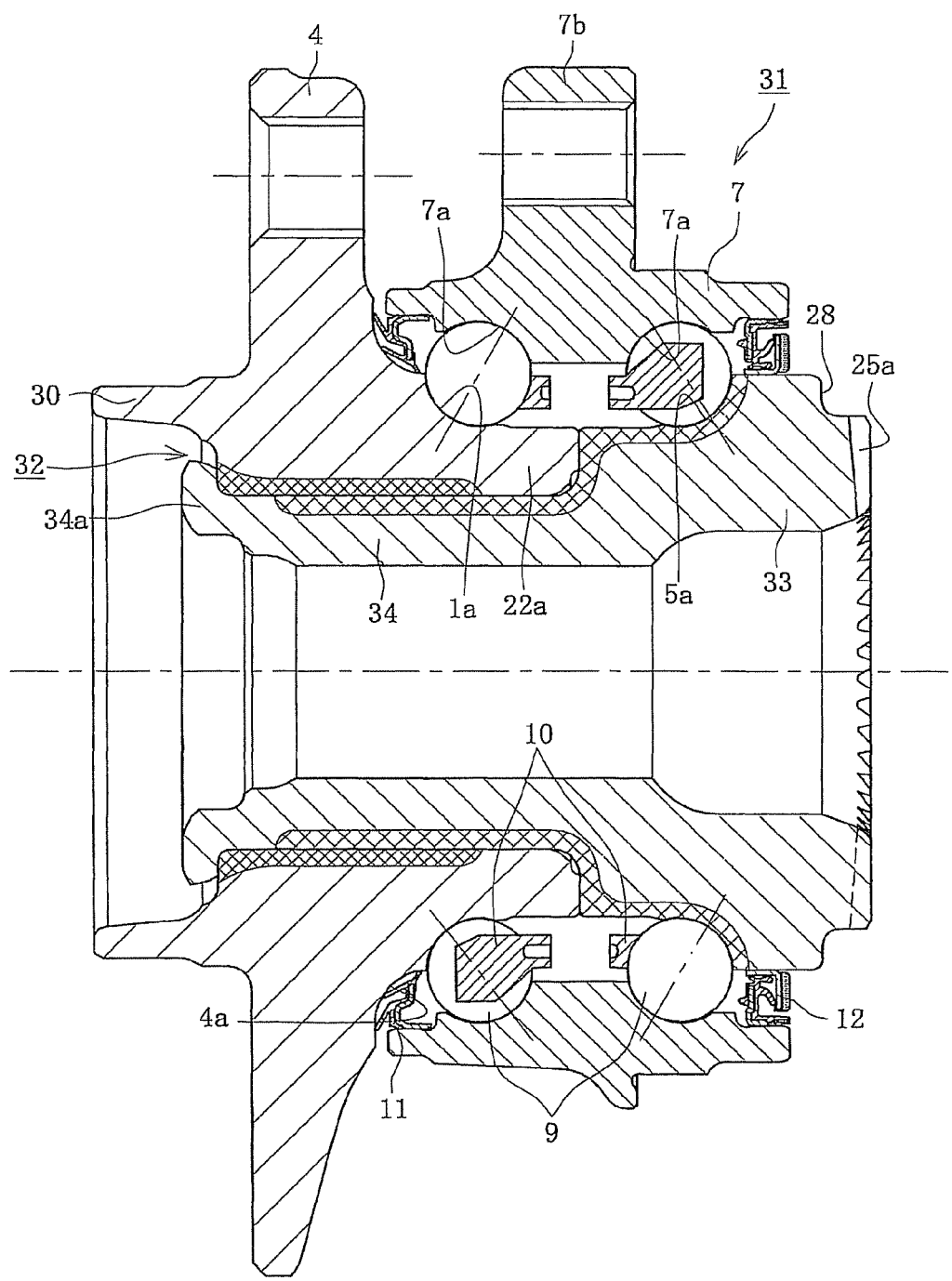

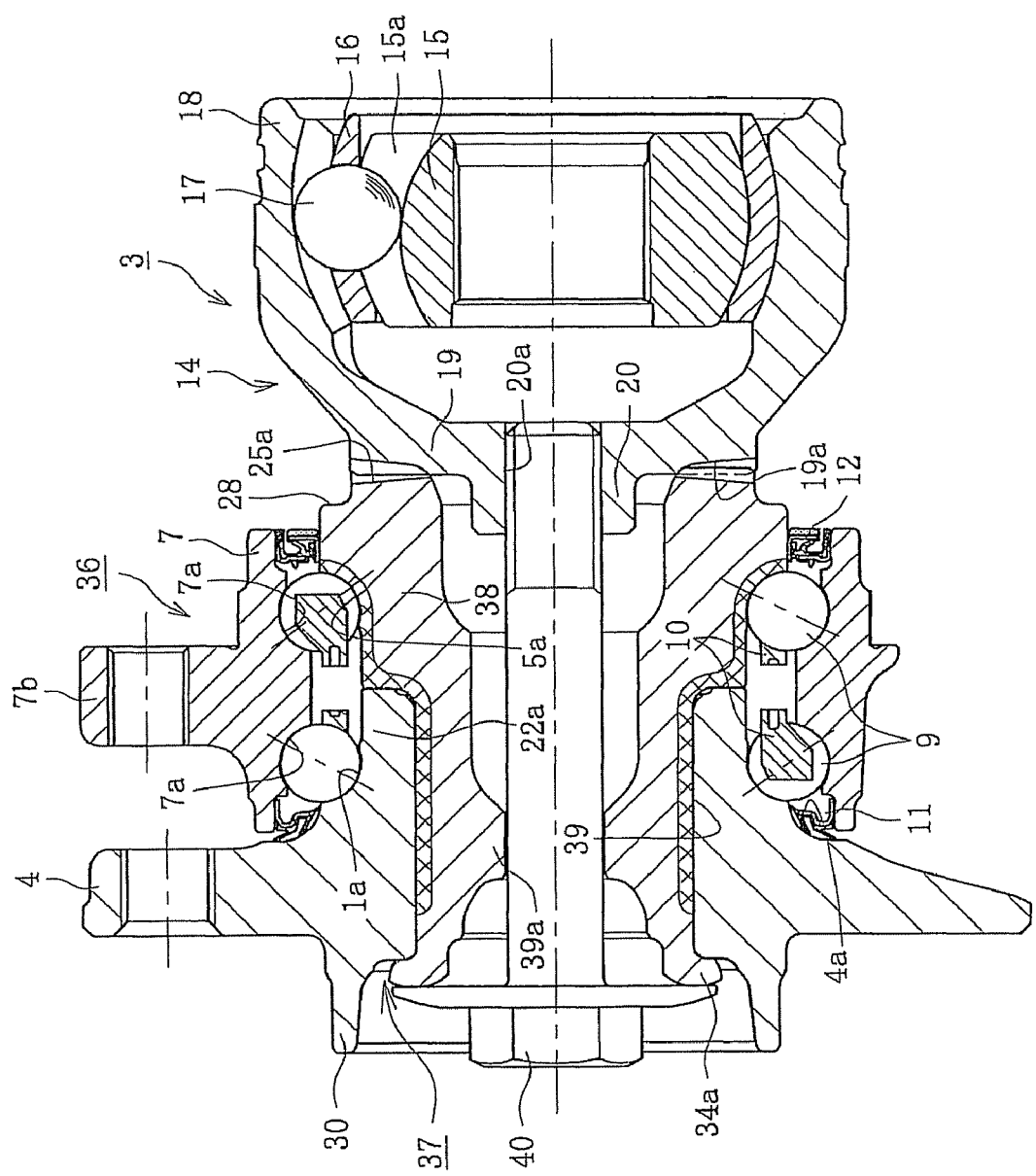
[Fig 8]

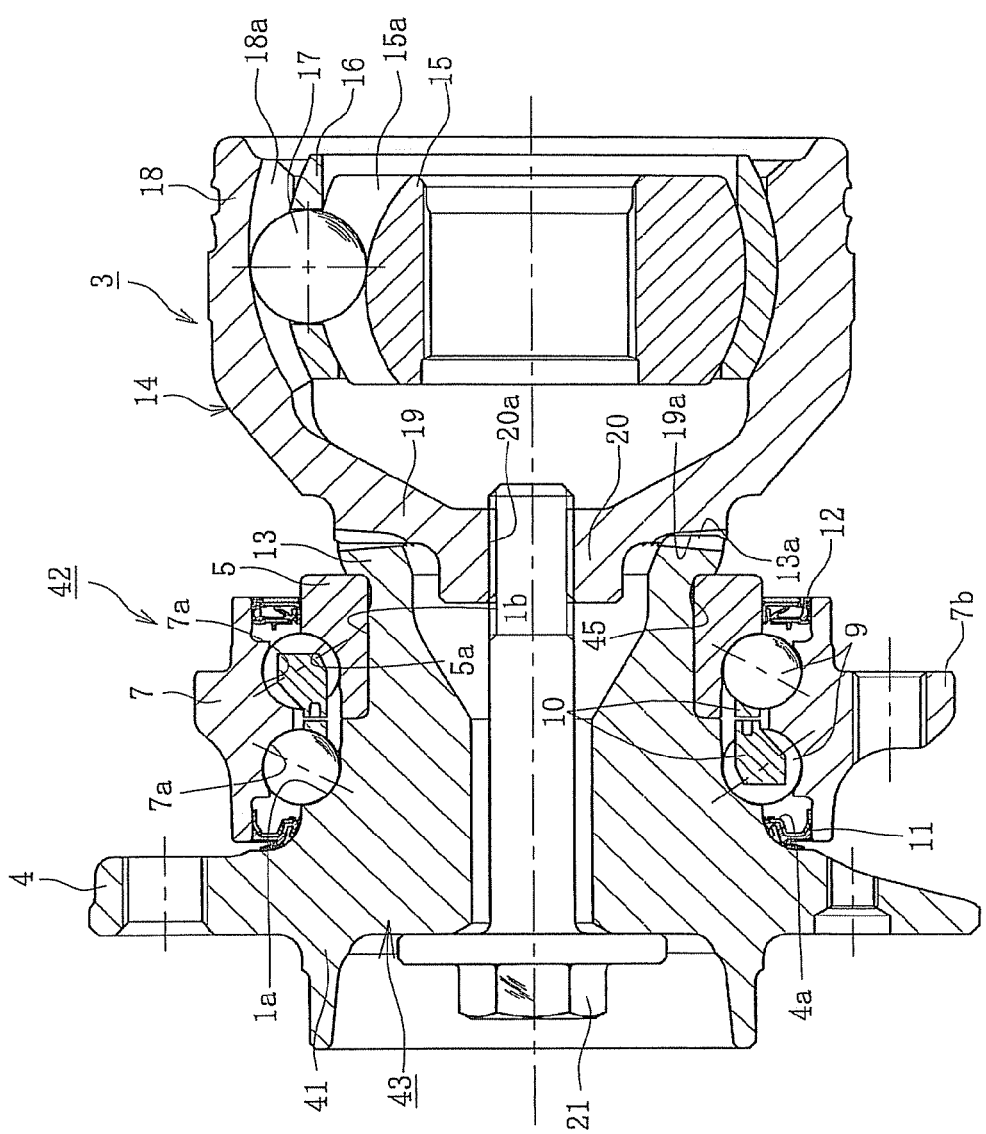
[Fig 9]

[Fig 10]
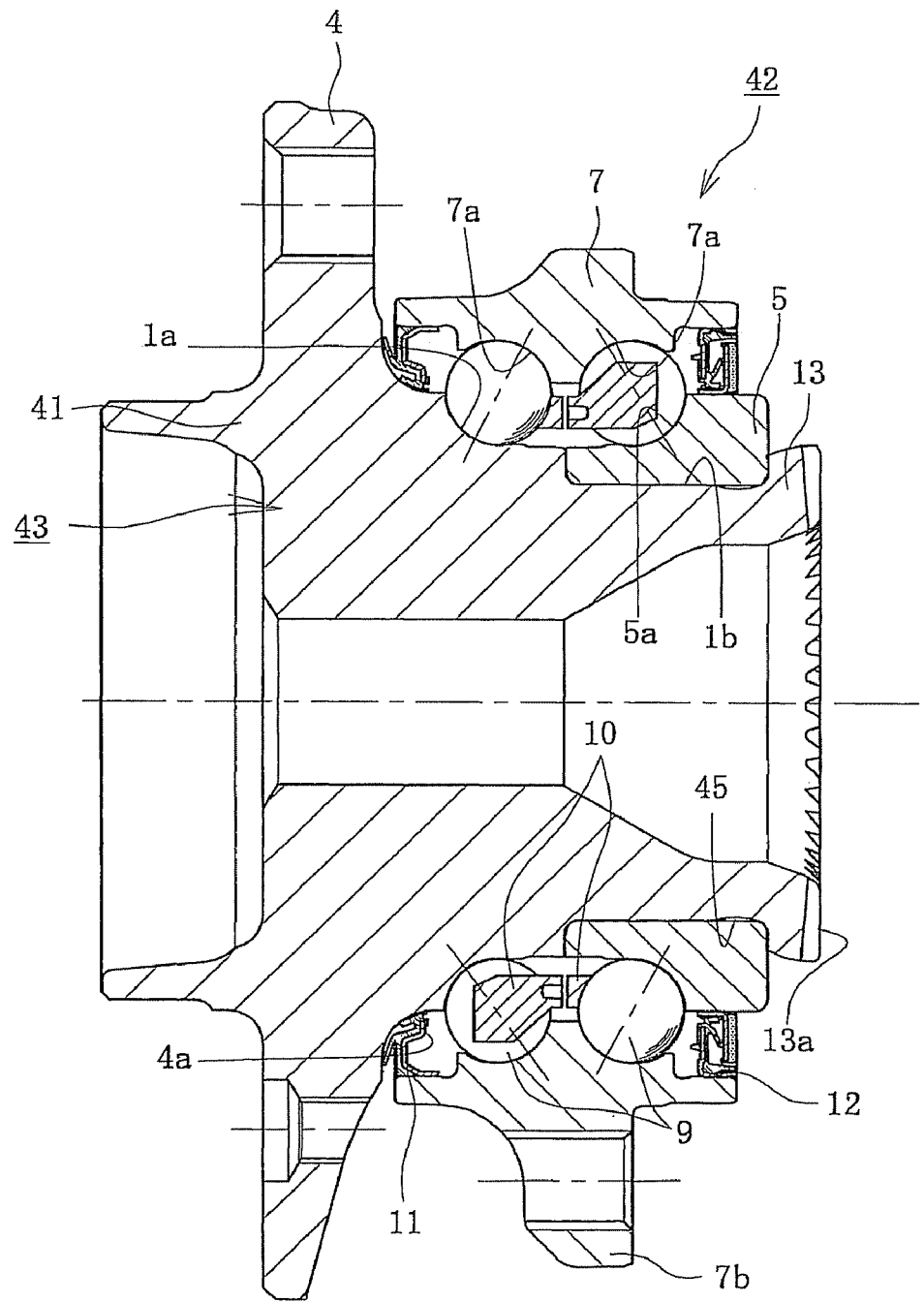

[ Fig 11 ]
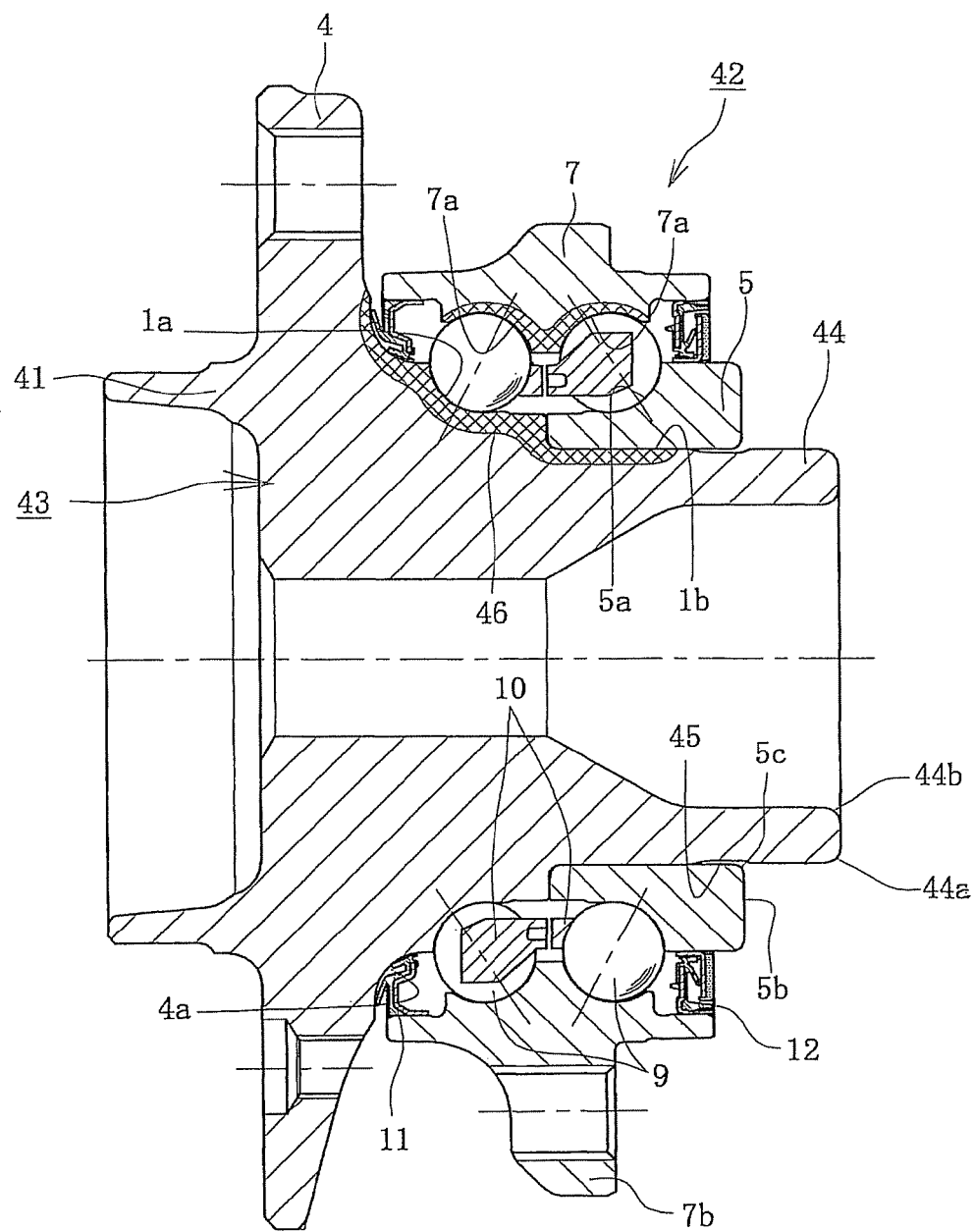

[ Fig 12 ]
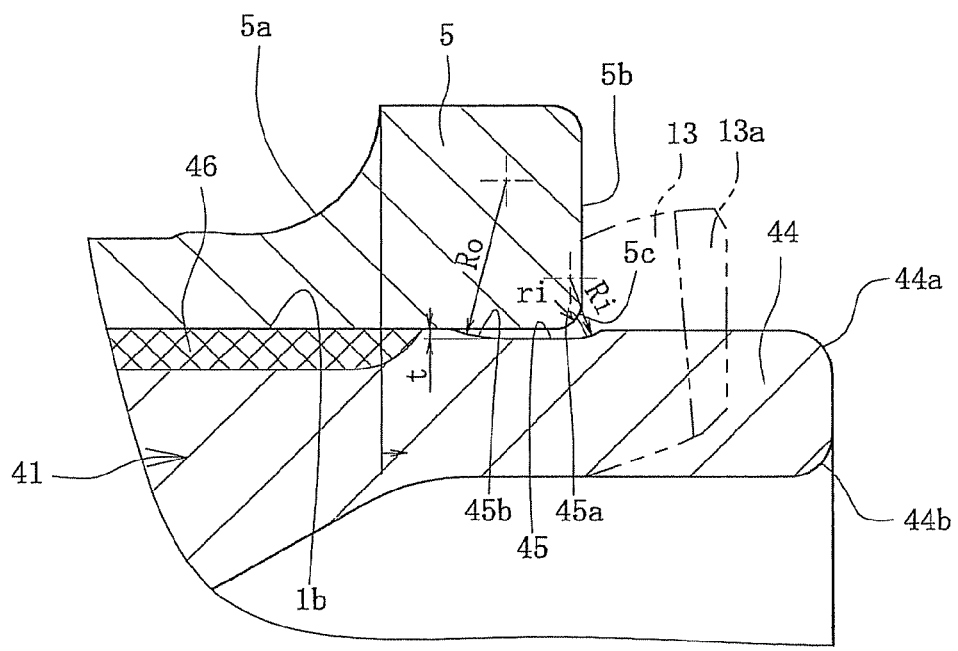
[ Fig 13 ]
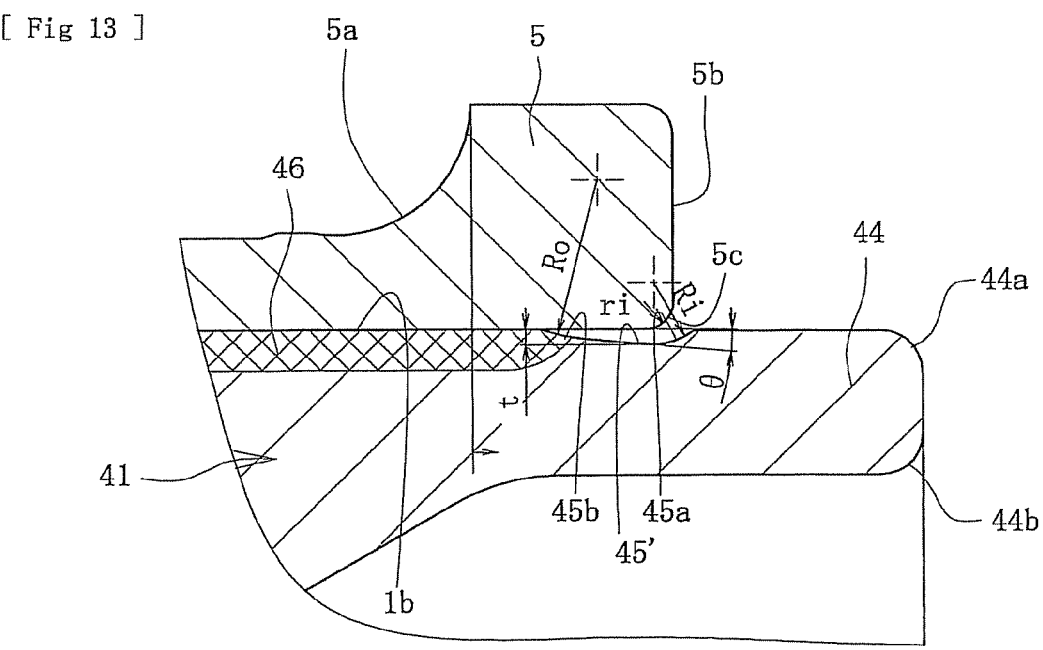

[Fig 14]
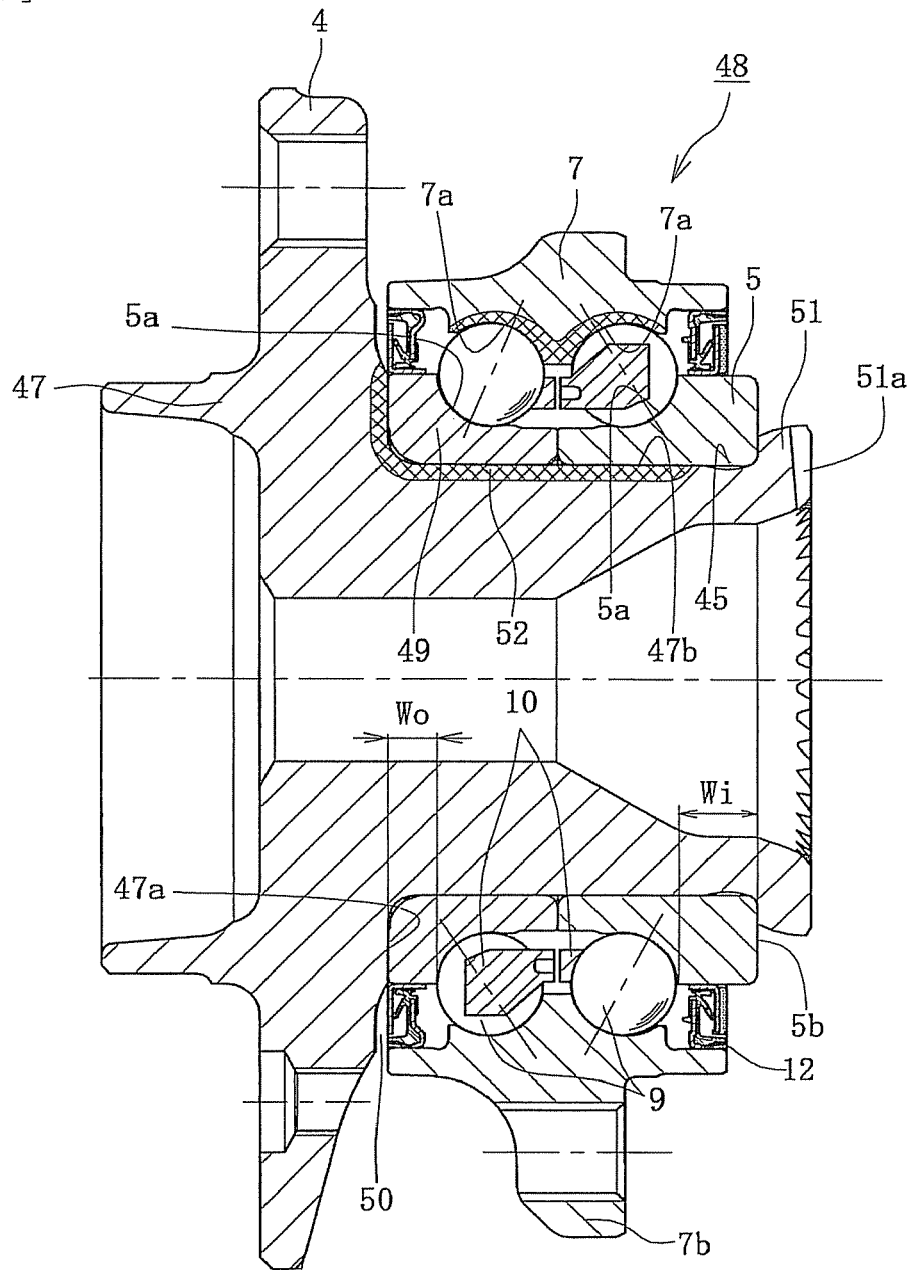

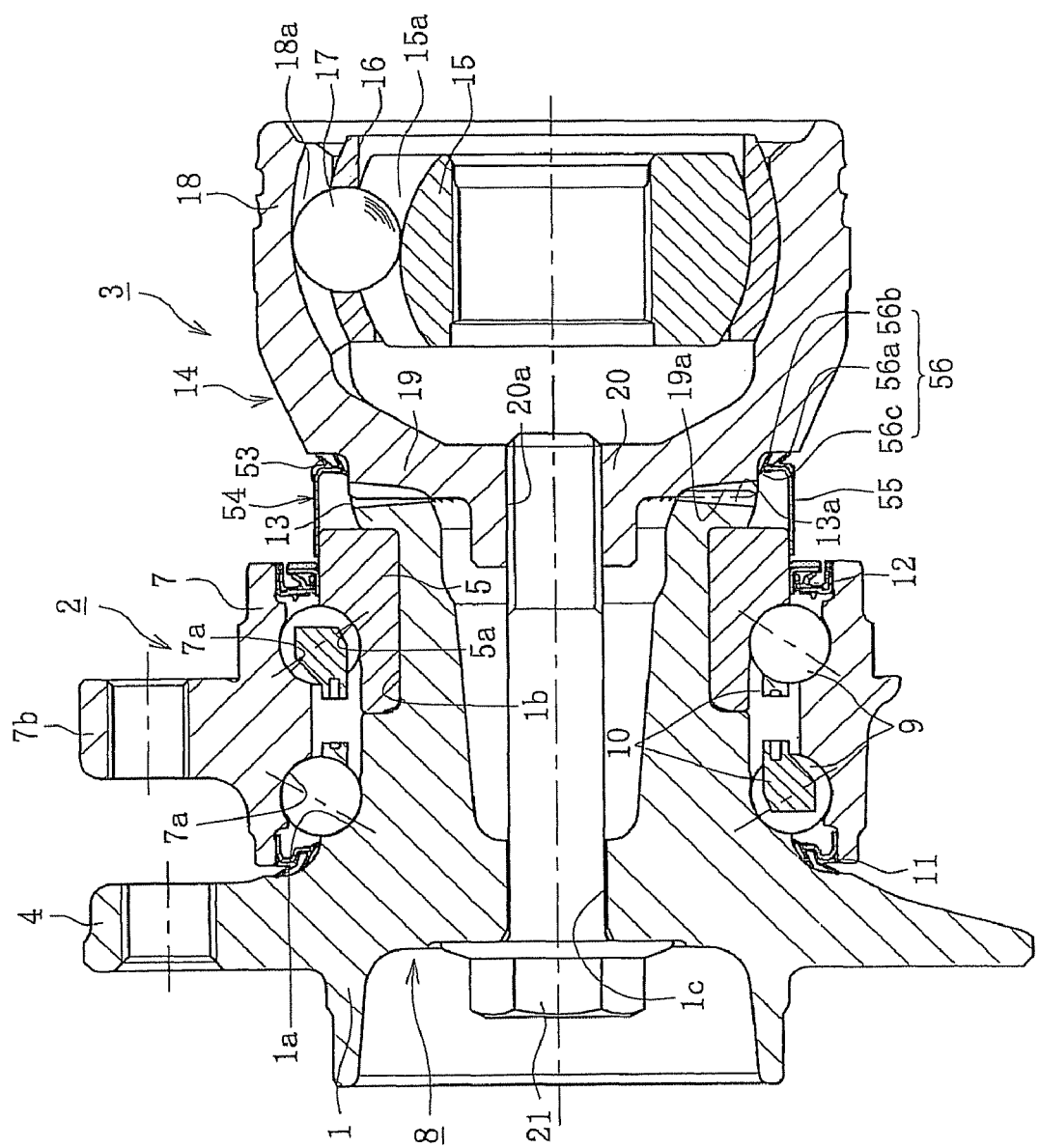
[Fig 15]

[ Fig 16 ]
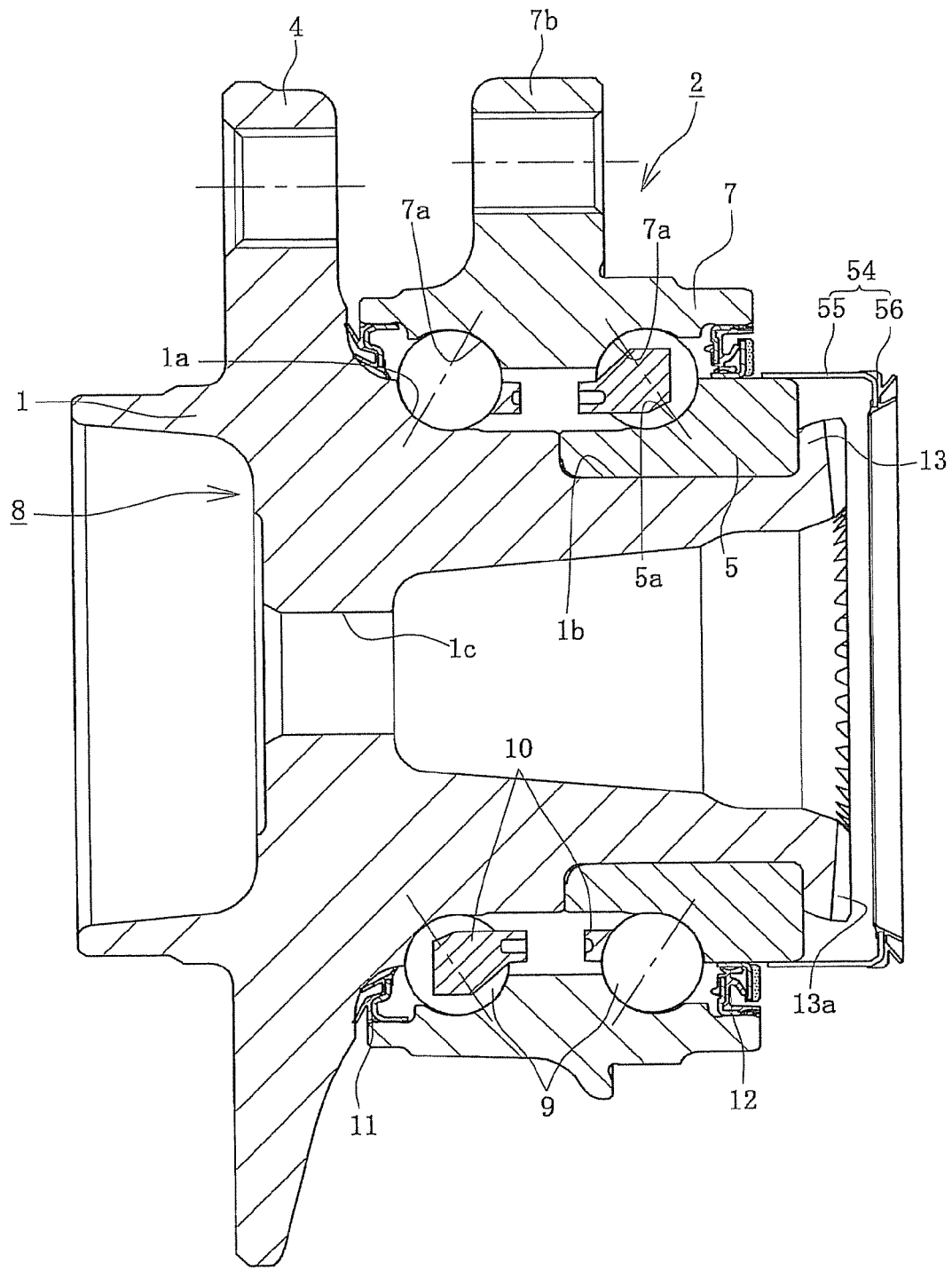

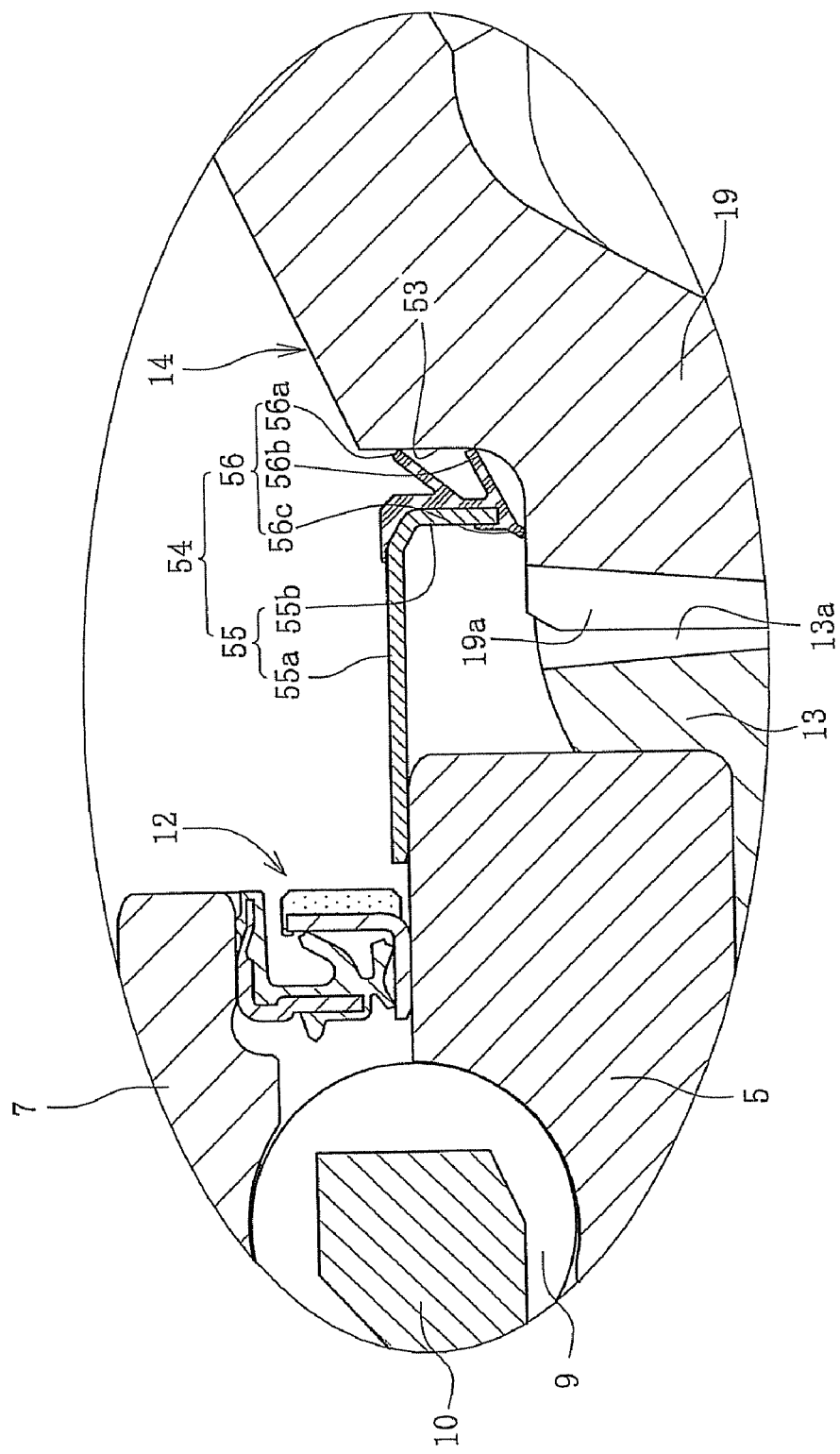
[Fig 17]

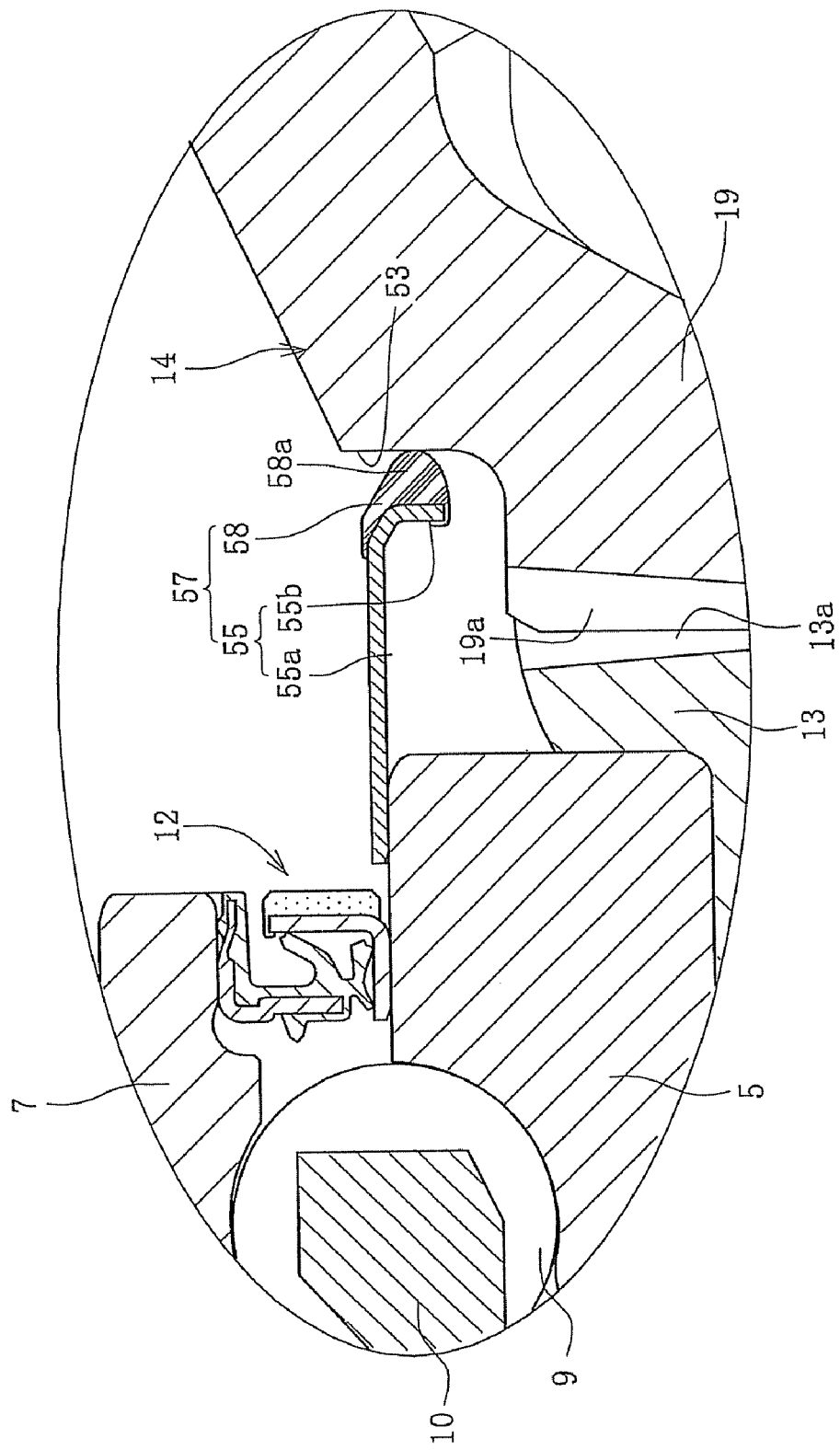
[Fig 18]

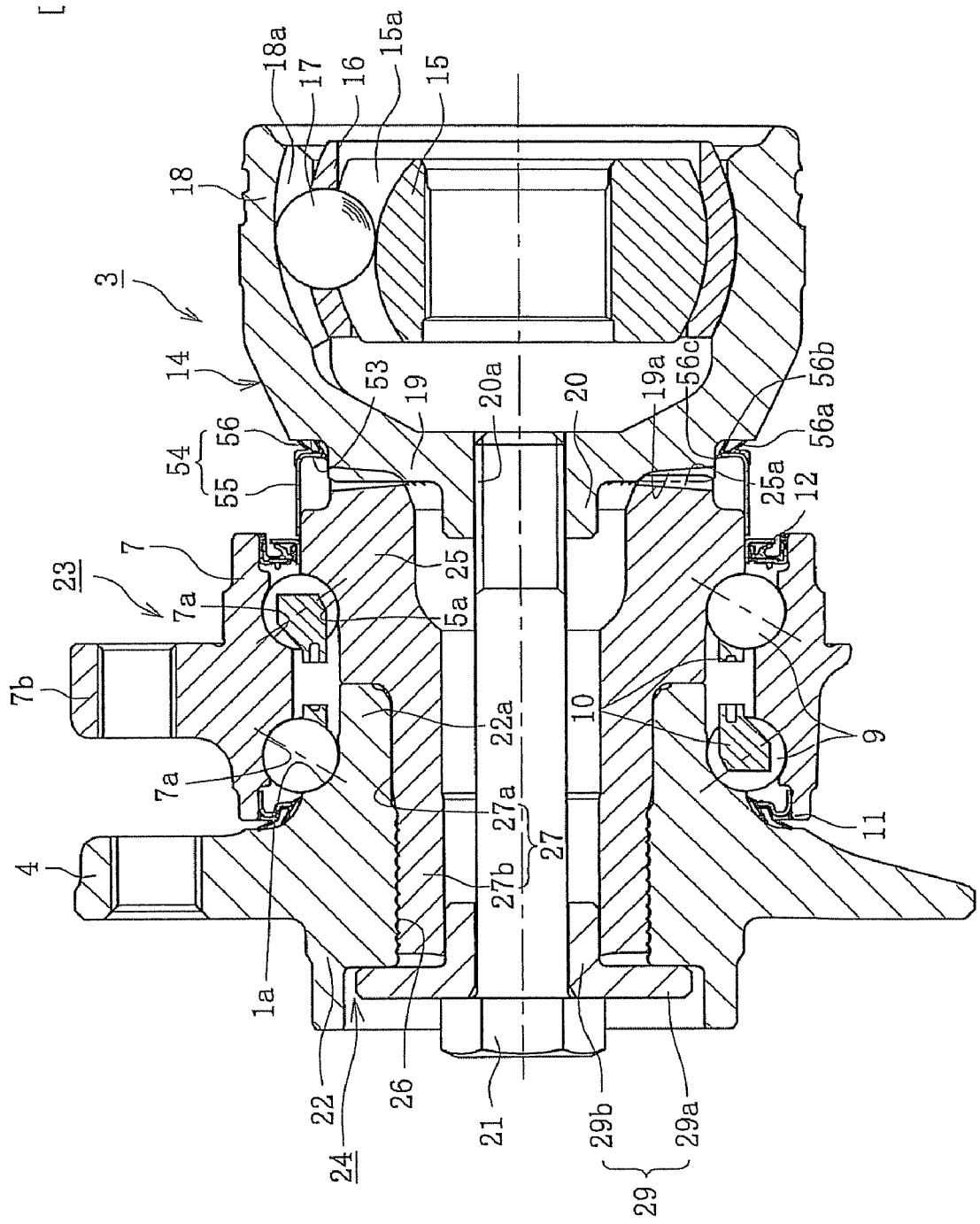
[ Fig 19 ]

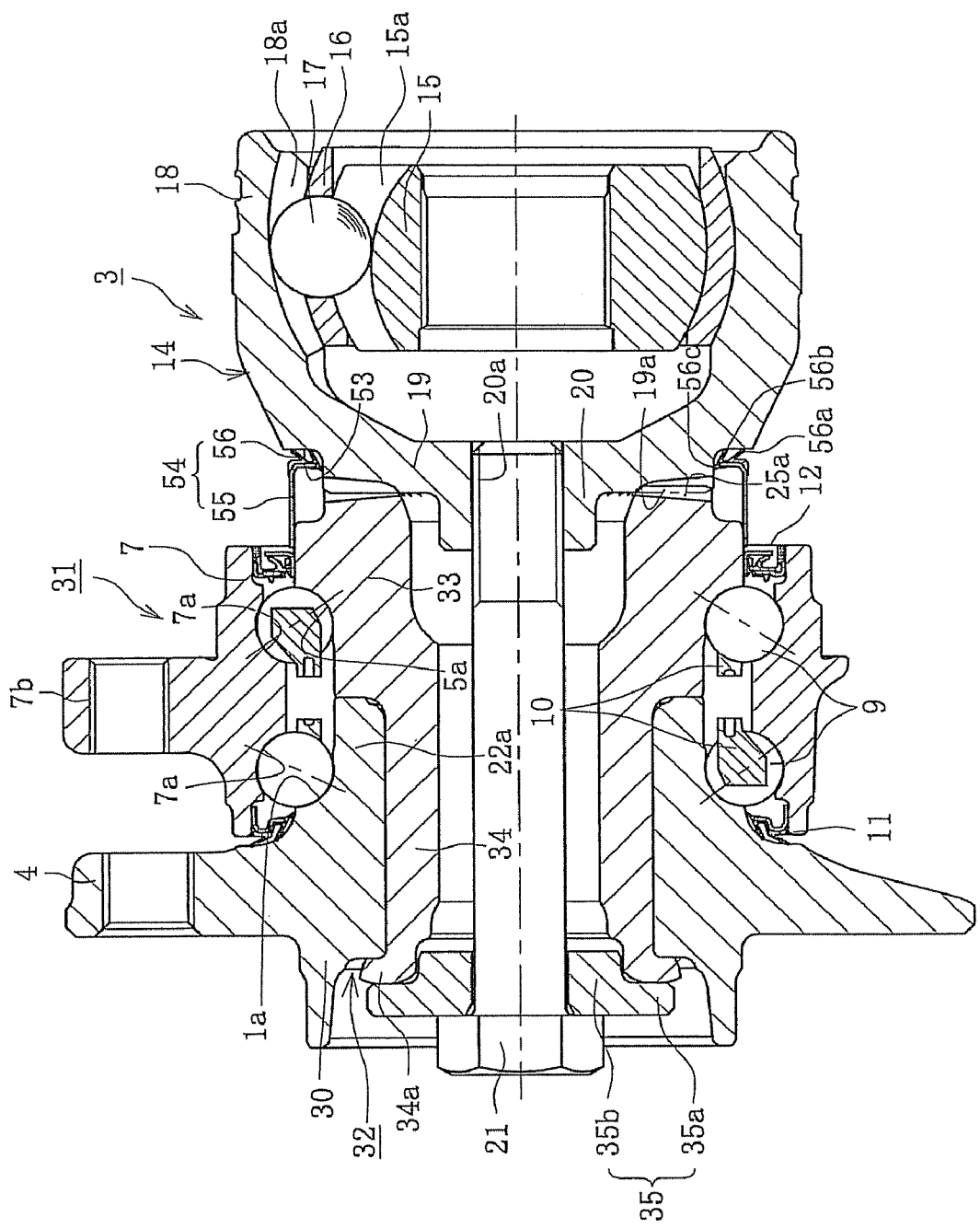
[ Fig 20 ]

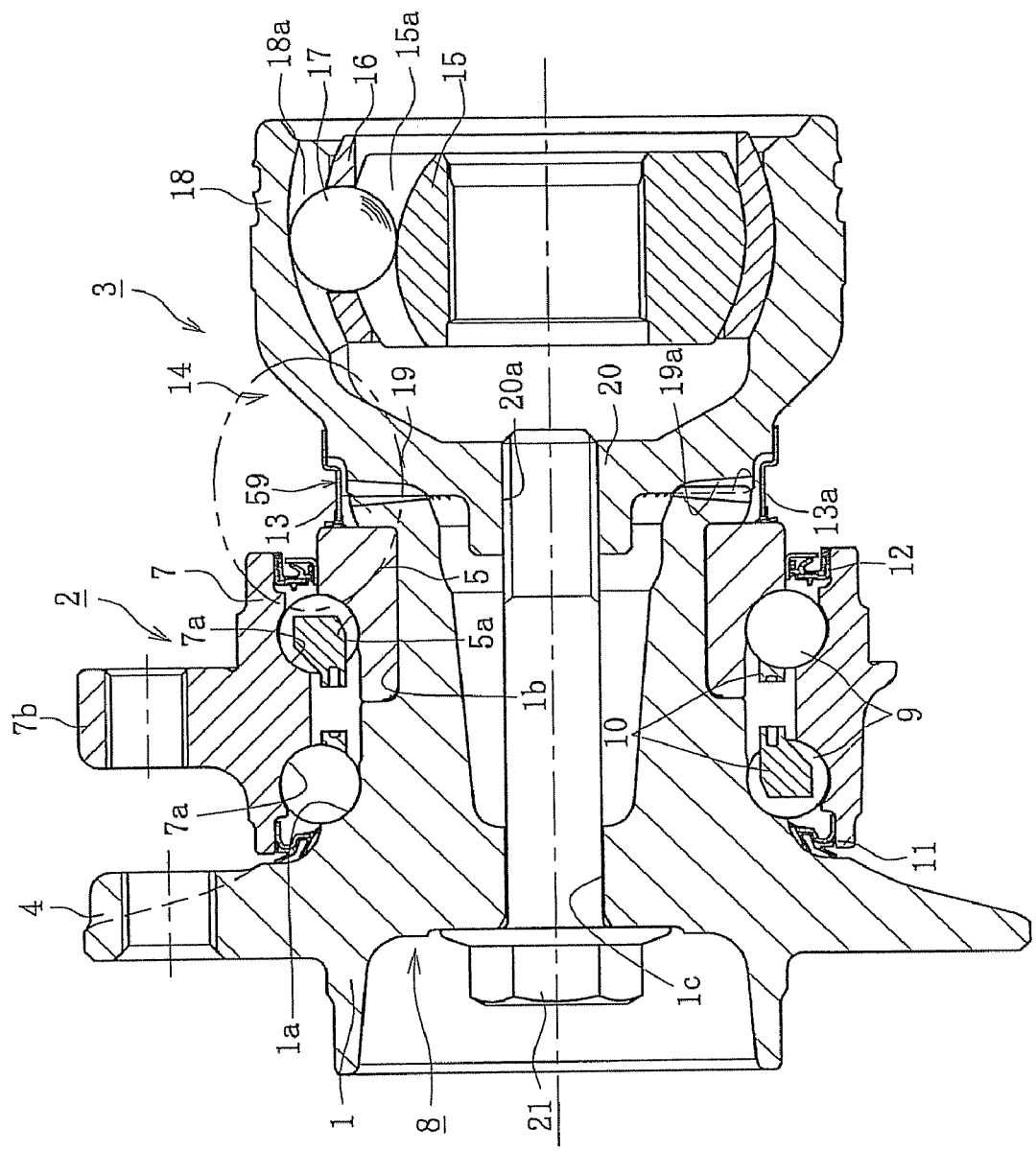
[Fig 21]

[Fig 22]
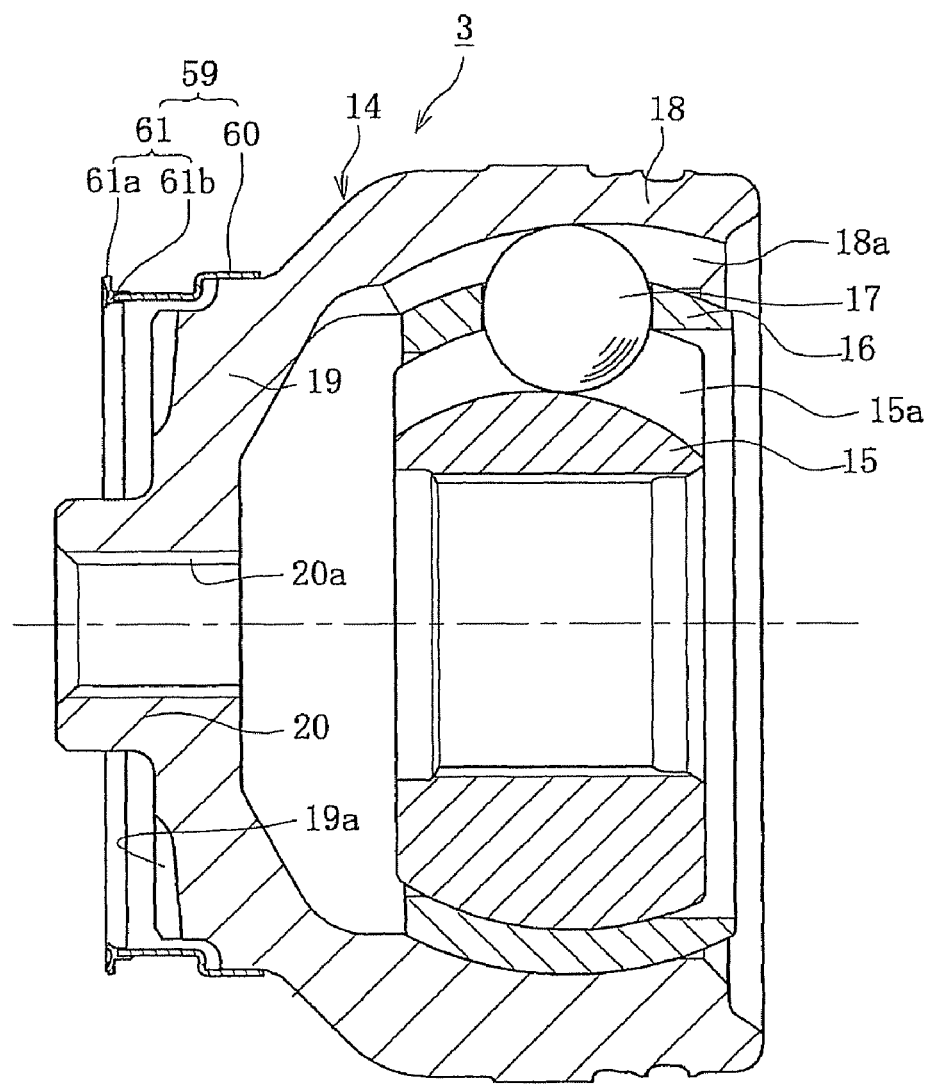

[Fig 23]
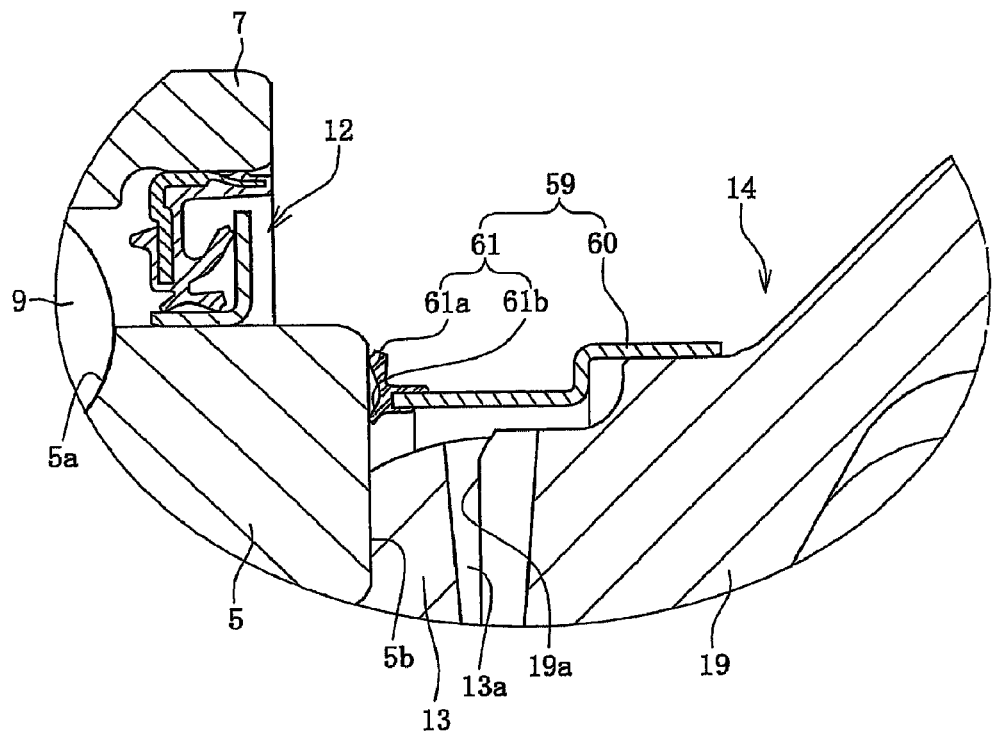
[Fig 24]
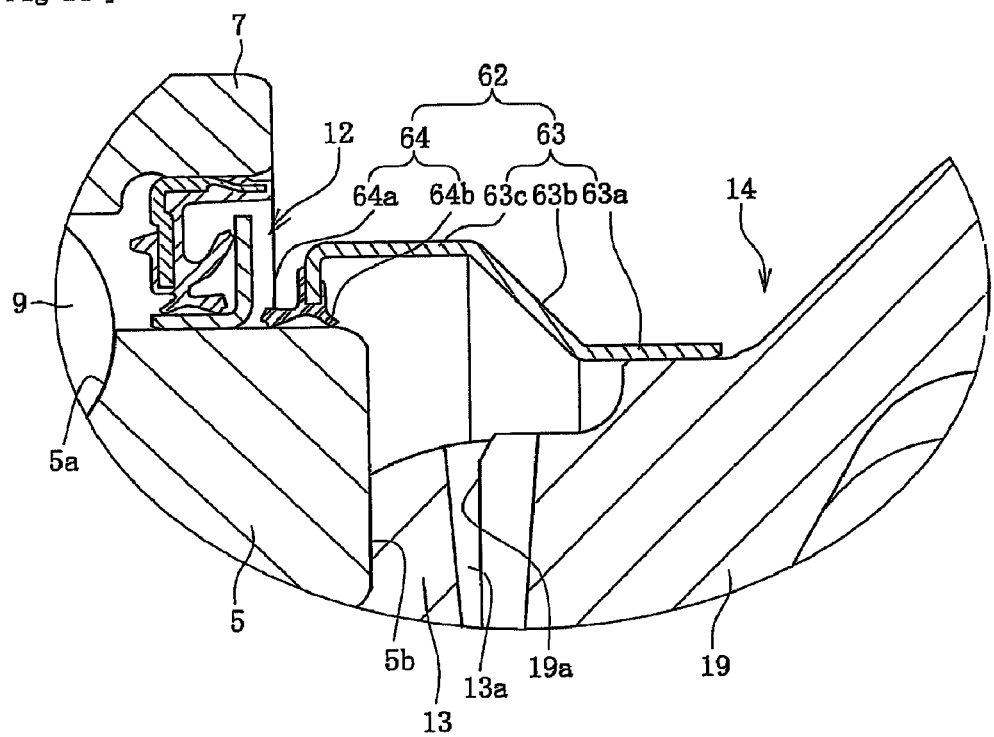

[ Fig 25 ]
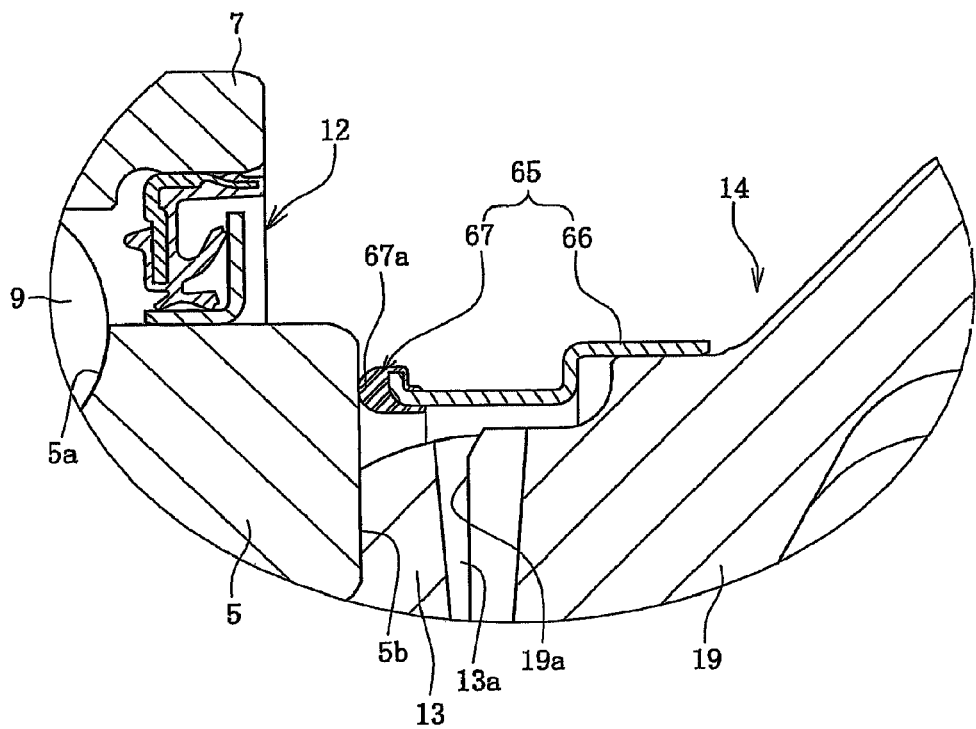
[ Fig 26 ]
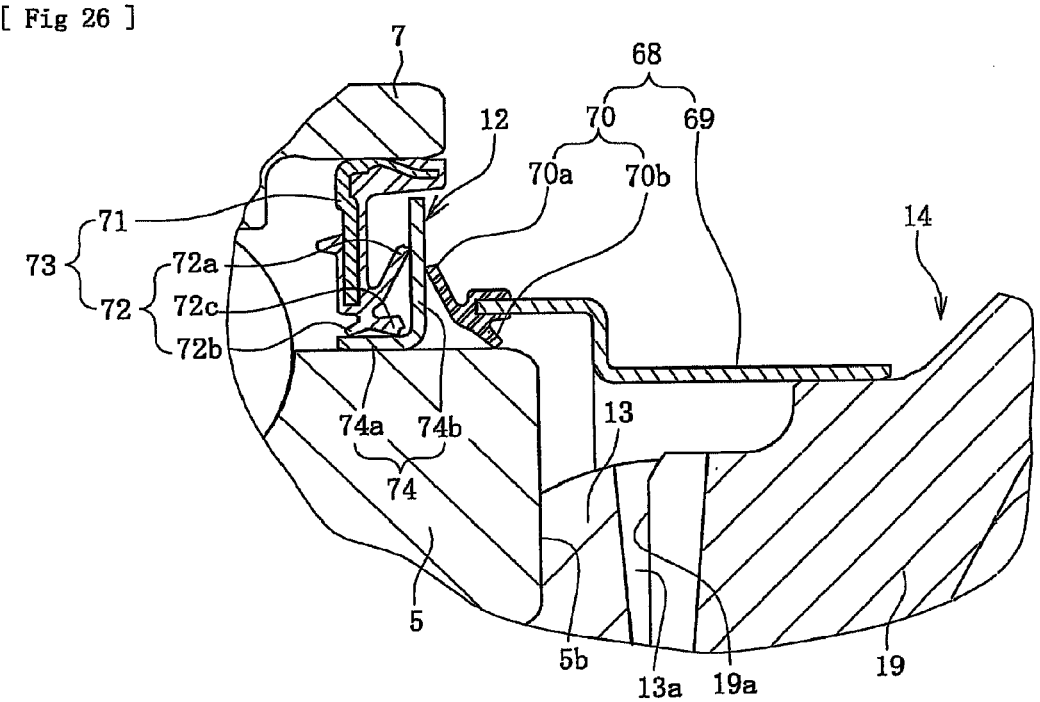

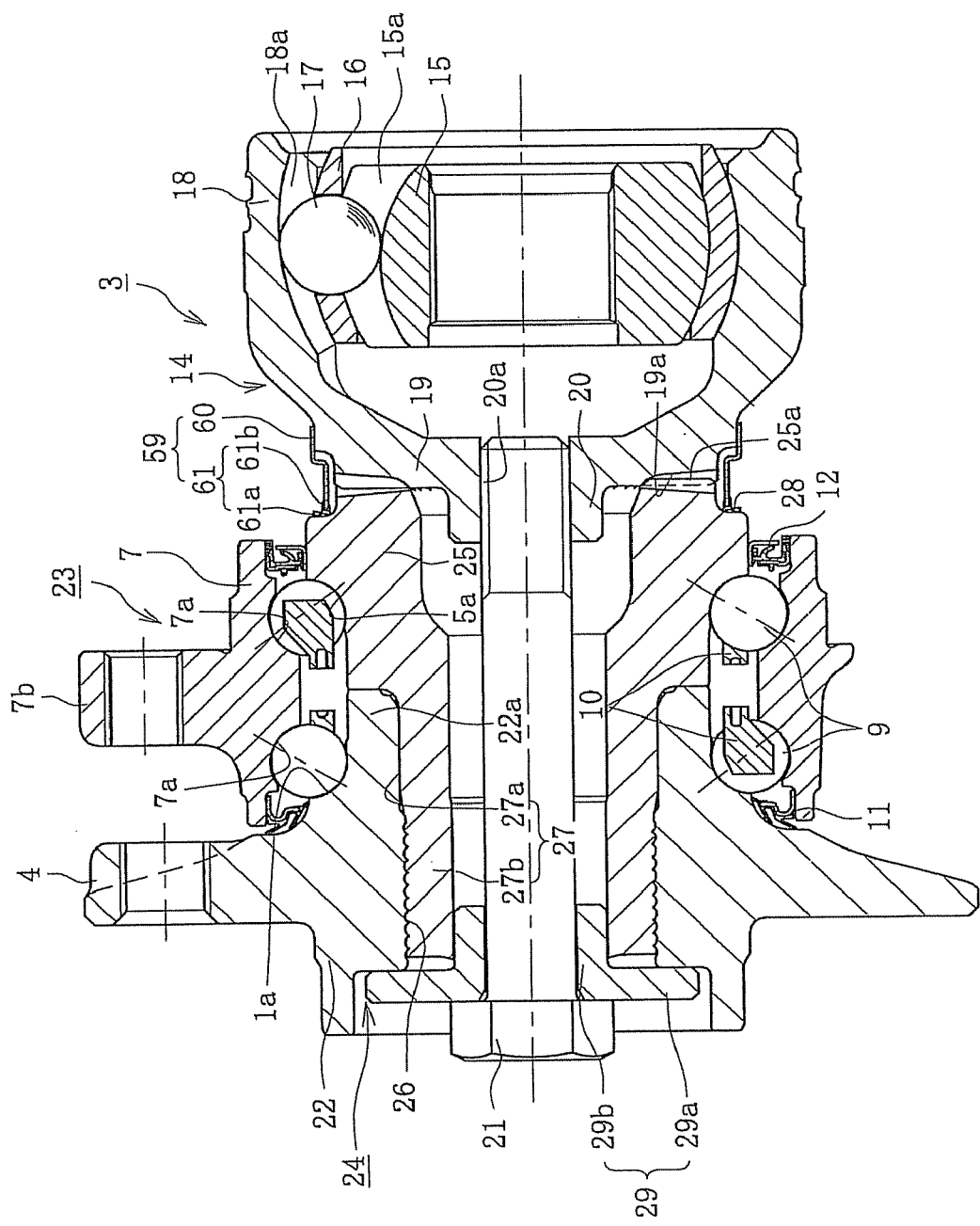
[Fig 27]

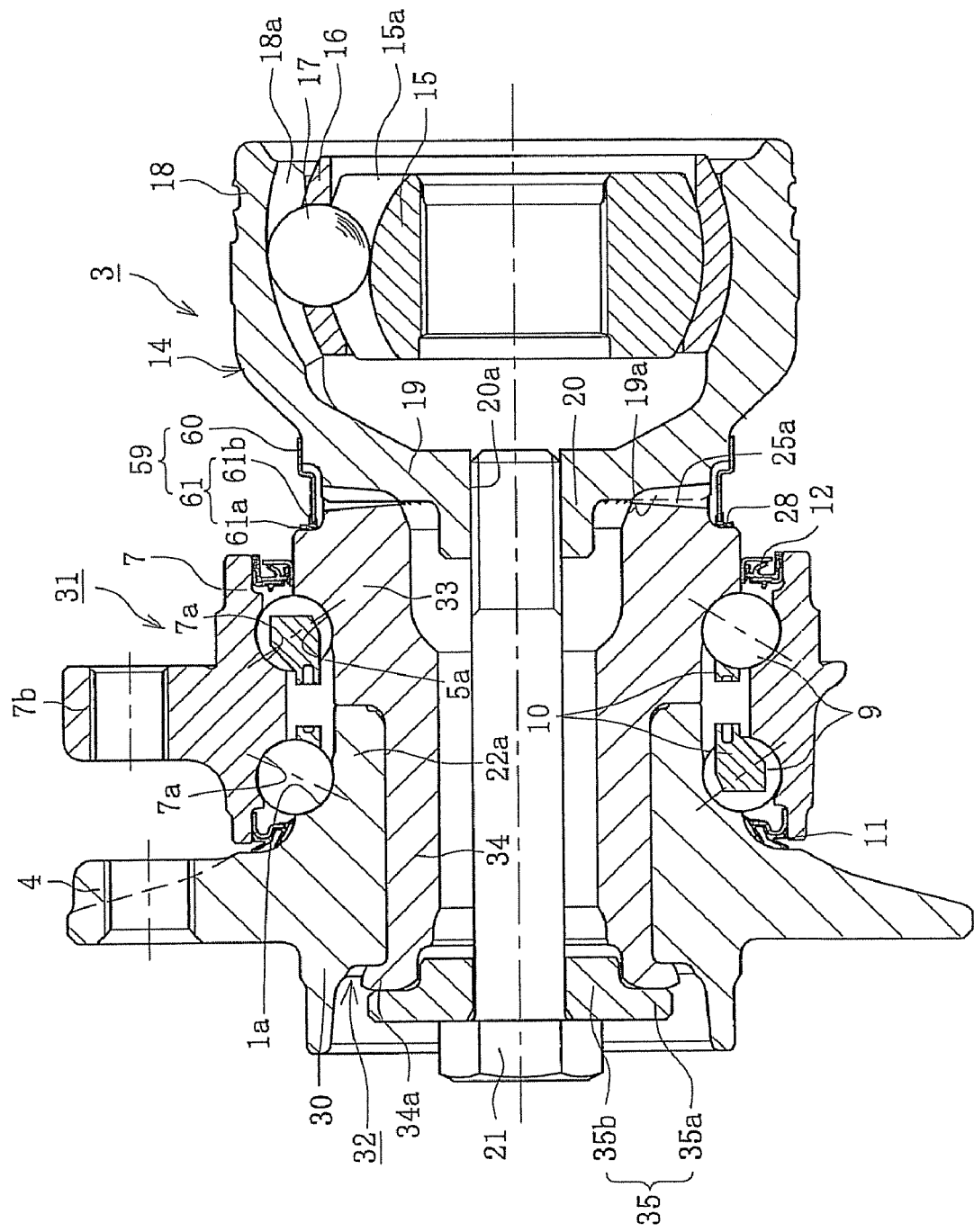
[ Fig 28 ]

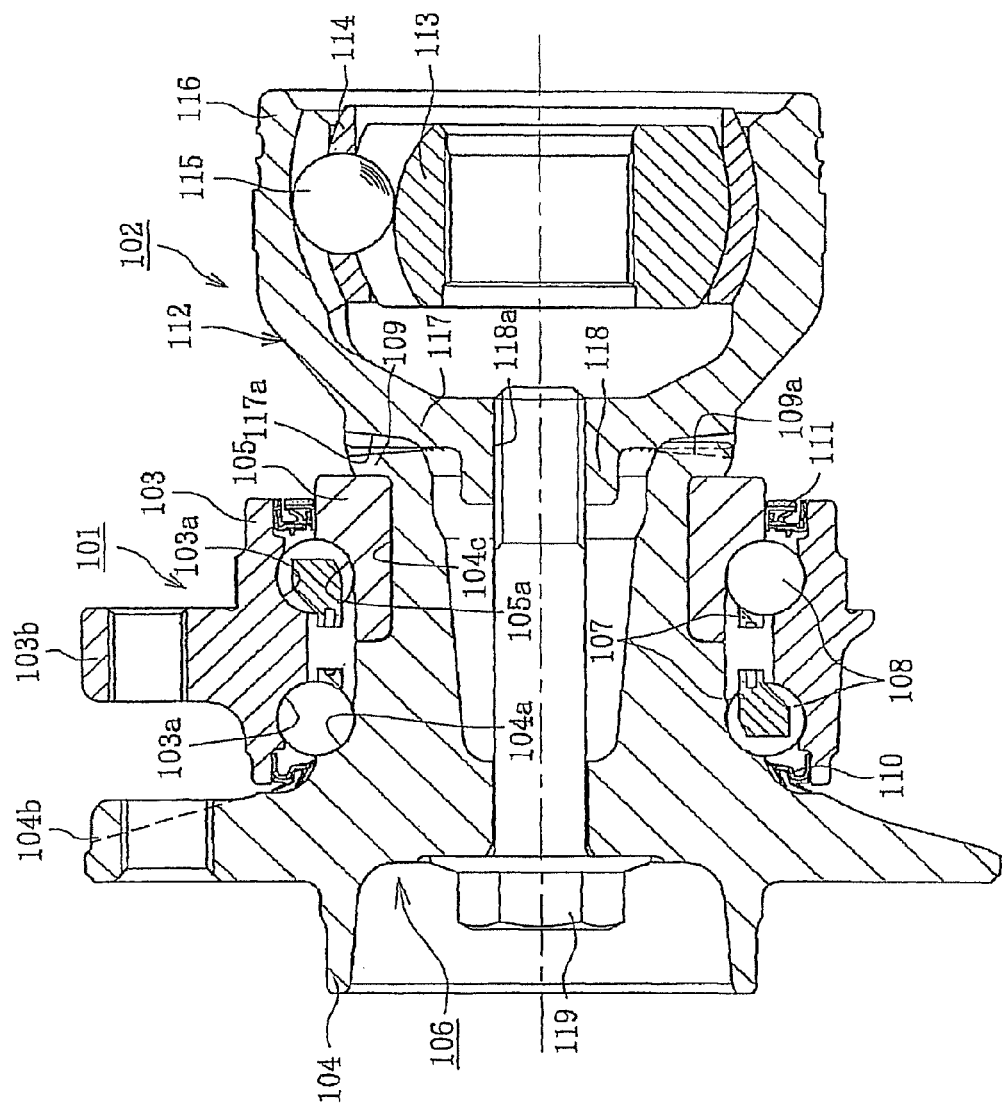
[Fig 29] PRIOR ART

DRIVING WHEEL BEARING APPARATUS

CROSS-REFERENCE TO RELATED APPLICATIONS

This application is a continuation of International Application No. PCT/JP2009/002485, filed Jun. 3, 2009 which claims priority to Japanese Application Nos. 2008-147034, filed Jun. 4, 2008; 2008-150492, filed Jun. 9, 2008; 2008-207117, filed Aug. 11, 2008; and 2008-208856, filed Aug. 14, 2008. The disclosures of the above applications are incorporated herein by reference.

FIELD

The present disclosure relates to a driving wheel bearing apparatus that rotatably supports a driving wheel of a vehicle, such as an automobile and, more particularly, to a driving wheel bearing apparatus with a bearing unit and a constant velocity universal joint that are detachably unitized.

BACKGROUND

A power transmission device that transfers engine power of a vehicle, such as an automobile, to a wheel has to transfer the power from the engine to the wheel. The device must tolerate radial or axial displacement and moment displacement from the wheel. The displacement occurs when the vehicle bounds or turns while running on a rough road surface. One end of a drive shaft provided between the engine side and the driving wheel side is coupled to a differential via a slidable constant velocity universal joint. The other end of the shaft is coupled to the wheel via a driving wheel bearing apparatus. The driving wheel bearing apparatus includes a fixed type constant velocity universal joint.

In recent years, the demand for enhanced fuel efficiency has grown sharply from the viewpoint of savings resources, environmental pollution, etc. Weight reduction of a wheel bearing apparatus, in particular, of the automobile parts has long received attention and strongly desired as a factor that fulfills such demands. Various proposals for a wheel bearing apparatus designed to achieve weight reduction have been made. It also becomes important to reduce costs by simplifying assembly and disassembly operations in an assembly site of the automobile or the like or a maintenance market.

A driving wheel bearing apparatus shown in FIG. 29 is a typical example that fulfils such demands. This driving wheel bearing apparatus has a structure where a double row rolling bearing 101 and a constant velocity universal joint 102 are detachably unitized. The double row rolling bearing 101 includes an outer member 103 with a body mounting flange 103b to be mounted on a car body. The body mounting flange 103b is integrally formed with the outer member 103. The outer member 103 has double row outer raceway surfaces 103a and 103a formed on its inner circumference. An inner member 106 includes a wheel hub 104 and an inner ring 105. The wheel hub 104 has a wheel mounting flange 104b for mounting a wheel (not shown). The wheel mounting flange 104b is integrally formed at one end of the wheel hub 104. The outer circumference of the wheel hub has an inner raceway surface 104a arranged opposite to one of the double row outer raceway surfaces 103a and 103a. A cylindrical portion 104c axially extends from the inner raceway surface 104a. The inner ring 105 is press-fit onto the cylindrical portion 104c of the wheel hub 104. The inner ring outer circumference includes an inner raceway surface 105a. The inner raceway surface 105a is arranged opposite to the other of the double row outer raceway surfaces 103a and 103a. Double row balls 108 and 108 are freely rollably contained between the raceway surfaces via a cage 107 placed between them. In addition, the inner ring 105 is axially secured to the wheel hub 104 by a caulked portion 109. The caulked portion 109 is formed by plastically deforming the end of the cylindrical portion 104c. Furthermore, a face spline 109a is formed at the end face of the caulked portion 109. The face spline 109a of the caulked portion 109 is formed while caulking is performed.

Seals 110 and 111 are mounted on the opening of an annular space formed between the outer member 103 and the inner member 106. The seals 110,111 prevent leakage of grease contained in the bearing and entry of rainwater, dust, etc. into the bearing from the outside.

The constant velocity universal joint 102 includes an outer joint member 112, a joint inner ring 113, a cage 114, and torque transmission balls 115. The outer joint member 112 has a cup-shaped mouth portion 116, a shoulder portion 117 that forms the bottom of the mouth portion 116, and a hollow shaft portion 118 that axially extends from the shoulder portion 117. The mouth portion 116, the shoulder portion 117, and the shaft portion 118 are formed integrally in the outer joint member 112. The inner circumference of the shaft portion 118 includes an internal thread 118a. A face spline 117a is formed at the end face of the shoulder portion 117. The face spline 117a engages the face spline 109a formed at the end face of the caulked portion 109. Rotational torque from a drive shaft (not shown) is transmitted to the wheel mounting flange 104b via the constant velocity universal joint 102 and the inner member 106.

A fastening bolt 119 is threadedly connected to the internal thread 118a of the shaft portion 118. The face splines 117a and 109a of the outer joint member 112 and the inner member 106, arranged opposite to each other, are supported with pressure by the fastening bolt 119. Thus, the double row rolling bearing 101 and the constant velocity universal joint 102 are detachably unitized. This makes it possible to realize a reduction in weight and size and simplify disassembly and assembly operations (refer to, for example, Patent Document JP-A-63-184501).

This driving wheel bearing apparatus enhances workability since the face spline 109a is formed while the caulked portion 109 is formed at the time of the oscillating caulking. Thus, this can reduce costs by reducing the number of processes. Since torque is transmitted by the face splines 109a and 117a, it is possible to realize a reduction in weight and size and simplify disassembly and assembly operations. However, since the face spline 109a is formed while the caulked portion 109 is formed at the time of the oscillating caulking, the surface of the tooth surface keeps the surface hardness obtained after cold plastic deformation. Thus, the surface hardness only shows a slight increase compared to the surface hardness obtained after the wheel hub 104 is forged. Since the fatigue strength generally increases proportionately with the surface hardness, a significant increase in the fatigue strength of the face spline 109a cannot be expected.

High frequency induction quenching may be performed on the face splines 109a and 117a to increase the surface hardness. These increases wear resistance and fatigue strength. However, this is undesirable because doing so not only affects engagement between the face splines 109a and 117a, due to distortion by heat treatment, but also causes a reduction in toughness due to the high degree of hardness.

SUMMARY

The present disclosure has been made in view of these circumstances. Thus, it is an object of the disclosure to provide a driving wheel bearing apparatus that enhances workability at the time of assembly and disassembly and increases durability.

It is another object of the disclosure to increase durability by ensuring the amount by which an inner ring is squeezed and to reduce the deformation of the inner ring associated with the oscillating caulking.

Still another object of the disclosure is to enhance the sealing performance of an engaging portion of the face splines.

To achieve the above objects, a driving wheel bearing apparatus with a double row rolling bearing and a constant velocity universal joint that are detachably unitized comprises the double row rolling bearing including an outer member with a body mounting flange adapted to be mounted on a car body. The body mounting flange is integrally formed on the outer circumference of the outer member. A double row outer raceway surface is integrally formed on the inner circumference of the outer member. An inner member is formed with a wheel hub and an inner ring. The wheel hub has a wheel mounting flange for mounting a wheel. The wheel mounting flange is integrally formed at one end of the wheel hub. The outer circumference of the wheel hub includes one inner raceway surface arranged opposite to one of the double row outer raceway surface. A cylindrical portion axially extends from the inner raceway surface. The inner ring is press-fit onto the wheel hub. The inner ring outer circumference includes the other inner raceway surface arranged opposite to the other double row outer raceway surface. A double row rolling element is freely rollably contained between the raceway surfaces of the inner member and the outer member. The inner ring is secured to the wheel hub by a caulked portion. The caulked portion is formed by plastically deforming an end of the cylindrical portion radially outward. The constant velocity universal joint has an outer joint member with a cup-shaped mouth portion, a shoulder portion, forming the bottom of the mouth portion, and a cylindrical shaft portion, axially extending from the shoulder portion. The shaft portion has an internal thread. The mouth portion, the shoulder portion, and the shaft portion are integrally formed in the outer joint member. Face splines are formed at the respective end faces of the shoulder portion of the outer joint member and the caulked portion. The face splines are supported with pressure by a fastening bolt that abuts an outer side end face of the wheel hub. The bolt is threadedly connected to the internal thread of the shaft portion. The double row rolling bearing and the constant velocity universal joint are coupled together in such a way that the double row rolling bearing and the constant velocity universal joint can transmit torque and are axially separable. Compressive remaining stress is placed on the surfaces of the face splines as a result of a surface modification.

The driving wheel bearing apparatus has the inner ring secured to the wheel hub by the caulked portion. The caulked portion is formed by plastically deforming an end of the cylindrical portion of the wheel hub radially outward. The face splines are formed at the respective end faces of the shoulder portion of the outer joint member and the caulked portion. The face splines are supported with pressure by the fastening bolt that abuts an outer side end face of the wheel hub. The bolt is threadedly connected to the internal thread of the shaft portion. The double row rolling bearing and the constant velocity universal joint are coupled together in such a way that the double row rolling bearing and the constant velocity universal joint can transmit torque and are axially separable. Compressive remaining stress is placed on the surfaces of the face splines as a result of surface modification.

Thus, it is possible to increase fatigue strength while keeping an intended shape and size without deformation caused by heat treatment. This provides a high-quality, high-reliability driving wheel bearing apparatus that increases wear resistance.

The face spline of the caulked portion is formed by plastic deformation while the caulked portion is formed. Thus, it is possible to reduce the number of processes and reduce costs.

A driving wheel bearing apparatus with a double row rolling bearing and a constant velocity universal joint are detachably unitized comprising the double row rolling bearing including an outer member with a body mounting flange to be mounted on a car body. The body mounting flange is integrally formed on the outer circumference of the outer member. The outer member is integrally formed with a double row outer raceway surface on its inner circumference. An inner member is formed with a wheel hub and a cylindrical inner ring member. The wheel hub has a wheel mounting flange for mounting a wheel. The wheel mounting flange is integrally formed at one end of the wheel hub. The wheel hub outer circumference includes one inner raceway surface arranged opposite to one of the double row outer raceway surface. A cylindrical portion axially extends from the inner raceway surface. The inner ring member is press-fit onto the wheel hub. The inner ring outer circumference includes the other inner raceway surface arranged opposite to the other double row outer raceway surface. A double row rolling element is freely rollably contained between the raceway surfaces of the inner member and the outer member. The constant velocity universal joint has an outer joint member with a cup-shaped mouth portion, a shoulder portion that forms the bottom of the mouth portion, and a cylindrical shaft portion that axially extends from the shoulder portion. The shaft portion has an internal thread. The mouth portion, the shoulder portion, and the shaft portion are integrally formed in the outer joint member. Face splines are formed at the respective end faces of the shoulder portion of the outer joint member and the inner ring member. The face splines are supported with pressure by a fastening bolt that abuts an outer side end face of the wheel hub. The bolt is threadedly connected to the internal thread of the shaft portion. The double row rolling bearing and the constant velocity universal joint are coupled together in such a way that the double row rolling bearing and the constant velocity universal joint can transmit torque and are axially separable. The wheel hub and the inner ring member are integrally plastically coupled together. Compressive remaining stress is placed on the surfaces of the face splines as a result of a surface modification.

The driving wheel bearing apparatus has the face splines formed at the respective end faces of the shoulder portion of the outer joint member and the inner ring member. The face splines are supported with pressure by the fastening bolt that abuts an outer side end face of the wheel hub. The bolt is threadedly connected to the internal thread of the shaft portion. The double row rolling bearing and the constant velocity universal joint are coupled together in such a way that the double row rolling bearing and the constant velocity universal joint can transmit torque and are axially separable. The wheel hub and the inner ring member are integrally plastically coupled together. Compressive remaining stress is placed on the surfaces of the face splines as a result of surface modification. Thus, it is possible to increase the fatigue strength and wear resistance while keeping an intended shape and size. This prevents variations or the like due to a gap between the teeth of the face spline or repeated working and thereby increases the reliability.

The face spline of the inner ring member is formed while the inner ring member is formed by cold forging. Thus, it is possible to enhance the yield of the material.

A step portion is formed at an end of the inner ring member. The face spline is formed at a projecting end face. Thus, it is possible to measure the size of a predetermined part by bringing a stylus of a measuring instrument into contact with the step portion. This makes it possible to manage the amount of preload of the bearing with ease.

A hardened irregular portion is formed on the inner circumference of the wheel hub. The wheel hub and the inner ring member are integrally plastically coupled together. A predetermined bearing preload is imposed by fitting a cylindrical part of the inner ring member onto the irregular portion and making the cylindrical part bite into the irregular portion by enlarging the diameter of the cylindrical part. Thus, there is no need to manage the amount of preload by tightly fastening them with a nut or the like as in the prior art. This makes it possible to realize a reduction in weight and size, increase the strength and durability of the wheel hub, and maintain the amount of preload for long periods of time.

A cylindrical part of the inner ring member may be fit onto the wheel hub. The wheel hub and the inner ring member may be plastically integrally coupled. A predetermined bearing preload is imposed by a caulked portion formed by plastically deforming an end of the cylindrical part radially outward.

The fastening bolt is threadedly connected to the internal thread of the shaft portion with a spacer placed between the bolt and wheel hub. The spacer is formed with a substantially L-shaped cross-sectional shape. The spacer has a flange portion that abuts an end face of the wheel hub. A cylindrical part is fit onto the fastening bolt and is guided into the wheel hub. Thus, it is possible to easily perform centering of the outer joint member and the inner member by the spacer. This simplifies assembly and disassembly operations of the apparatus. In addition, the face splines can engage with no circumferential and axial looseness.

A guide portion is formed on the inner circumference of a cylindrical part of the inner ring member. The guide portion projects radially inward. The fastening bolt is placed through the guide portion and is threadedly connected into the internal thread of the shaft portion. Thus, it is possible to perform centering of the outer joint member and the inner member. This simplifies assembly and disassembly operations of the apparatus.

The surface hardness of the face spline is set at 300 Hv or more. Thus, it is possible to maximize the mechanical strength and the fatigue strength of the material and increase the wear resistance.

The surface of the face spline may be subjected to shot peening or WPC treatment as a surface modification.

Hardening by laser hardening may be performed on the surface of the face spline. Thus, it is possible to prevent the deformation due to heat treatment and increase the strength and wear resistance of the tooth surface of the face spline. This makes it possible to increase the reliability over a long period of time.

An end of the cylindrical portion, before caulking, is formed as a hollow cylindrical part. An annular groove, with a predetermined depth, is formed on an outer circumferential surface of the cylindrical part from a position corresponding to a larger diameter end of the inner raceway surface of the inner ring to a position over a larger end face of the inner ring. An end of the cylindrical part is plastically deformed so that part of the annular groove is brought into intimate contact with a chamfered portion of the inner ring. The remaining part does not make contact with the inner ring and a space is left.

The cylindrical part is easily deformed at the time of caulking. An intended shape and size of the face spline and the amount by which the inner ring is squeezed are ensured. The deformation of the inner ring associated with the oscillating caulking is prevented, making it possible to increase the durability.

The annular groove is formed in an area ranging from a position corresponding to the larger diameter end of the inner raceway surface of the inner ring to the chamfered portion on the larger end face side, the area that slightly spreads over the larger end face. Oscillating caulking brings about a state where part of the annular groove is brought into intimate contact with a chamfered portion of the inner ring. The remaining part does not make contact with the inner ring and space is left. Thus, this makes it possible to ensure a predetermined amount by which the inner ring is squeezed and prevents the deformation of the inner ring caused by oscillating caulking.

The bottom of the annular groove is formed as a tapered face. It has a diameter that gradually decreases toward the tip of the cylindrical part. The angle of inclination of the tapered face is set at 15° or less. Thus, it is possible to further reduce the hoop stress produced in the inner ring at the time of oscillating caulking.

Circular arc surfaces, having radii of curvature Ri and Ro, may be formed on the sides of the annular groove. The radius of curvature Ri of the inner side circular arc surface of the circular arc surfaces may be smaller than the radius of curvature Ro of the outer side circular arc surface ($Ri \leq Ro$). It may be set within a range of R1 to 10.

A chamfered portion, having a circular arc surface with a radius of curvature, is formed at an inside diameter end on the larger end face side of the inner ring. The radius of curvature of the chamfered portion is set within a range of R1.0 to 2.5. Thus, it is possible to prevent stress concentration from occurring at the root of the caulked portion when a bending moment load is imposed on the apparatus while the vehicle is being operated. This prevents excessive hoop stress from being produced in the inner ring by oscillating caulking.

The depth of the annular groove is set at a depth of 0.5 to 2.0 mm. Thus, it is possible to ensure an intended amount by which the inner ring is squeezed while preventing deformation of the inner ring.

A hardened layer is formed in the cylindrical portion of the wheel hub by high frequency induction quenching to have a surface hardness of 50 to 64 HRC. An inner side edge of the hardened layer is placed within an area from an outer side starting point in the annular groove to 0 to 4.0 mm on the outer side. On the inner side, it is positioned to 0 to 3.0 mm in an area of an outer side circular arc surface of the annular groove. Thus, it is possible to improve the workability of the cylindrical part in the cylindrical portion and prevent cracks or the like from developing by the plastic deformation.

Two inner rings are press-fit onto the cylindrical portion of the wheel hub. The positions of the inner raceway surfaces of the two inner rings are the same. The length from the larger diameter end of the inner raceway surface of the inner ring on the caulking side to the larger end face is made longer than the length from the larger diameter end of the inner raceway surface of the other inner ring to the larger end face. Thus, it is possible to prevent the deformation of the inner ring on the caulking side associated with oscillating caulking.

A seal is mounted on the outside diameter of the inner ring or the inner ring member. The seal includes a metal core press-fit onto the outside diameter of the inner ring or the inner ring member. A seal member, made of synthetic rubber, is integrally bonded to the metal core by vulcanized adhesion or the like. The seal member has an axial lip. The axial lip makes elastic contact with the shoulder portion of the outer joint member, thus sealing an engaging portion of the face splines. Accordingly, it is possible to prevent foreign matter from the outside, such as rainwater and dust, from entering the engaging portion of the face splines. When dimensional variations occur due to a production error or an assembly error in the inner member or the outer joint member, the seal obtains high sealing performance over a long period of time because the axial lip has adequate elasticity. This makes it possible to enhance workability at the time of disassembly and assembly.

The seal member has a side lip slidingly extending radially outward. A stepped portion is formed in the shoulder portion of the outer joint member. The side lip is brought into elastic contact with the stepped portion. When dimensional variations occur due to a production error or an assembly error in the inner member or the outer joint member, it is possible to obtain high sealing performance by following the variations by the deformation of the side lip.

The tip of the axial lip is formed into the shape of a circular arc. When the wheel hub or the outer joint member is deformed due to a heavy moment load imposed on it, it is possible to follow that deformation appropriately, making it possible to obtain high sealing performance.

The seal member has a grease lip. The engaging portion of the face splines is filled with grease. The grease lip prevents leakage of grease. Thus, it is possible to prevent the face splines from wearing.

An exterior seal is mounted on the outside diameter of the shoulder portion of the outer joint member. The exterior seal includes a cylindrical metal core and a seal member. The cylindrical metal core is press-fit onto the outside diameter of the shoulder portion. The seal member is integrally bonded to the metal core by vulcanized adhesion or the like. A lip of the seal member is brought into elastic contact with the inner member or an inner side seal of the seal. This seals the engaging portion of the face splines. Thus, it is possible to prevent foreign matter from the outside, such as rainwater and dust, from entering the engaging portion of the face splines. When dimensional variations occur due to a production error or an assembly error in the inner member or the outer joint member, it is possible to obtain high sealing performance over a long period of time due to the seal lip having adequate elasticity. This makes it possible to enhance workability at the time of assembly and disassembly.

The seal member has bifurcating side lips sidlingly extending radially. The side lips are brought into elastic contact with the larger end face of the inner ring. When dimensional variations occur due to a production error or an assembly error in the inner member or the outer joint member, it is possible to obtain high sealing performance by following the variations by the deformation of the side lip.

The seal member has an axial lip with a circular arc tip. The axial lip is brought into elastic contact with the larger end face of the inner ring. When the wheel hub or the outer joint member is deformed due to a heavy moment load imposed on it, it is possible to follow that deformation appropriately, making it possible to obtain high sealing performance.

The seal member has a pair of bifurcating radial lips. The radial lips are brought into elastic contact with the outside diameter of the inner ring. When the wheel hub or the outer joint member is deformed due to a heavy moment load imposed on it, it is possible to follow that deformation appropriately, making it possible to obtain high sealing performance.

The inner side seal is formed as a pack seal. The pack seal includes ring-shaped seal plate and a slinger with a substantially L-shaped cross-sectional shape. The seal plate is formed with a metal core fit into the end of the outer member. The metal core has a substantially L-shaped cross-sectional shape. A seal member is integrally bonded to the metal core by vulcanized adhesion. The slinger includes a cylindrical part, press-fit onto the outside diameter of the inner ring, and an upstanding portion, extending from the cylindrical part radially outward. The seal member of the exterior seal has a side lip sidlingly extending radially outward and a radial lip sidlingly extending radially inward. The side lip is brought into elastic contact with a side face of the upstanding portion of the slinger. The radial lip is brought into elastic contact with the outside diameter of the inner ring. Thus, it is possible to prevent foreign matter from the outside, such as rainwater and dust, from entering the engaging portion of the face splines. The seal prevents foreign matter, such as rainwater and dust, from entering the bearing through a fit portion between the slinger and the inner ring. Thus, this increases the durability of the bearing.

A driving wheel bearing apparatus has a double row rolling bearing and a constant velocity universal joint which are detachably unitized. In the apparatus, the double row rolling bearing includes an outer member. The outer member has a body mounting flange to be mounted on a car body. The body mounting flange is integrally formed on the outer circumference of the outer member. The outer member is integrally formed with a double row outer raceway surface on its inner circumference. An inner member includes a wheel hub and an inner ring. The wheel hub has a wheel mounting flange for mounting a wheel. The wheel mounting flange is integrally formed at one end of the wheel hub. One inner raceway surface is formed on the outer circumference of the wheel hub. The one inner raceway surface is arranged opposite to one of the double row outer raceway surface. A cylindrical portion axially extends from the inner raceway surface. The inner ring is press-fit onto the wheel hub. The inner ring has the other inner raceway surface formed on its outer circumference. The other inner raceway surface is arranged opposite to the other double row outer raceway surface. A double row rolling element is freely rollably contained between the raceway surfaces of the inner member and the outer member. The inner ring is secured to the wheel hub by a caulked portion. The caulked portion is formed by plastically deforming an end of the cylindrical portion radially outward. The constant velocity universal joint has an outer joint member, having a cup-shaped mouth portion, a shoulder portion, forming the bottom of the mouth portion, and a cylindrical shaft portion, axially extending from the shoulder portion. The shaft portion has an internal thread. The mouth portion, the shoulder portion, and the shaft portion are integrally formed in the outer joint member. Face splines are formed at the respective end faces of the shoulder portion of the outer joint member and the caulked portion. The face splines are supported with pressure by a fastening bolt that abuts an outer side end face of the wheel hub and is threadedly connected to the internal thread of the shaft portion. The double row rolling bearing and the constant velocity universal joint are coupled together in such a way that the double row rolling bearing and the constant velocity universal joint can transmit torque and are axially separable. Compressive remaining stress is placed on the surfaces of the face splines as a result of surface modification. Thus, it is possible to increase fatigue strength while keeping an intended shape and size without deformation caused by heat treatment. This provides a high-quality, high-reliability driving wheel bearing apparatus by increasing wear resistance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of a first embodiment of a driving wheel bearing apparatus.

FIG. 2 is a longitudinal section view of a bearing unit of FIG. 1.

FIG. 3 is a longitudinal section view of a constant velocity universal joint of FIG. 1.

FIG. 4 is a longitudinal section view of a second embodiment of the driving wheel bearing apparatus.

FIG. 5 is a longitudinal section view of a bearing unit of FIG. 4.

FIG. 6 is a longitudinal section view of a third embodiment of the driving wheel bearing apparatus.

FIG. 7 is a longitudinal section view of a bearing unit of FIG. 6.

FIG. 8 is a longitudinal section view of a fourth embodiment of the driving wheel bearing apparatus.

FIG. 9 is a longitudinal section view of a fifth embodiment of the driving wheel bearing apparatus.

FIG. 10 is a longitudinal section view of a bearing unit of FIG. 9.

FIG. 11 is a longitudinal section view of a bearing unit of FIG. 10 with the bearing unit before oscillating caulking.

FIG. 12 is an enlarged view of the principal portion of FIG. 11.

FIG. 13 is an enlarged view of the principal portion of a modified embodiment of FIG. 12.

FIG. 14 is a longitudinal section view of a sixth embodiment of the driving wheel bearing apparatus.

FIG. 15 is a longitudinal section view of a seventh embodiment of the driving wheel bearing apparatus.

FIG. 16 is a longitudinal section view of a bearing unit of FIG. 15.

FIG. 17 is an enlarged view of the principal portion of a seal portion of FIG. 15.

FIG. 18 is a modified enlarged view of the principal portion of a seal of FIG. 17.

FIG. 19 is a longitudinal section view of an eighth embodiment of the driving wheel bearing apparatus.

FIG. 20 is a longitudinal section view of a ninth embodiment of the driving wheel bearing apparatus.

FIG. 21 is a longitudinal section view of a tenth embodiment of the driving wheel bearing apparatus.

FIG. 22 is a longitudinal section view of a constant velocity universal joint of FIG. 21.

FIG. 23 is an enlarged view of the principal portion of an exterior seal portion of FIG. 21.

FIG. 24 is a modified enlarged view of the principal portion of an exterior seal of FIG. 23.

FIG. 25 is another modified enlarged view of the principal portion of the exterior seal of FIG. 23.

FIG. 26 is still another modified enlarged view of the principal portion of the exterior seal of FIG. 23.

FIG. 27 is a longitudinal section view of an eleventh embodiment of the driving wheel bearing apparatus.

FIG. 28 is a longitudinal section view of a twelfth embodiment of the driving wheel bearing apparatus.

FIG. 29 is a longitudinal section view of an existing driving wheel bearing apparatus.

DETAILED DESCRIPTION

A driving wheel bearing apparatus has a double row rolling bearing (2) and a constant velocity universal joint (3) that are detachably unitized. The double row rolling bearing (2) includes an outer member (7) that has a body mounting flange (7b) to be mounted on a car body. The body mounting flange (7b) is integrally formed on the outer circumference of the outer member (7). The outer member (7) is integrally formed with a double row outer raceway surface (7a, 7a) on its inner circumference. An inner member (8) includes a wheel hub and an inner ring (15). The wheel hub (1) has a wheel mounting flange (4) for mounting a wheel. The wheel mounting flange (4) is integrally formed at one end of the wheel hub (1). One inner raceway surface (1a) is formed on the outer circumference of the wheel hub (1). The one inner raceway surface (5a) is arranged opposite to one of the double row outer raceway surface (7a, 7a). A cylindrical portion (1b) axially extends from the inner raceway surface (1a). The inner ring (5) is press-fit onto the wheel hub (1). The inner ring (5) is formed with the other inner raceway surface (5a) on its outer circumference. The other inner raceway surface (5a) is arranged opposite to the other double row outer raceway surface (7a, 7a). A double row rolling element (9, 9) is freely rollably contained between the raceway surfaces of the inner member (1a, 5a) and the outer member (7a, 7a). The inner ring (5) is secured to the wheel hub (1) by a caulked portion (13). The caulked portion (13) is formed by plastically deforming the end of the cylindrical portion (16) radially outward. The constant velocity universal joint (3) has an outer joint member (14), having a cup-shaped mouth portion (18), a shoulder portion (19), forming the bottom of the mouth portion, and a cylindrical shaft portion (20), axially extending from the shoulder portion (19). The shaft portion (20) has an internal thread (20a). The mouth portion (18), the shoulder portion (19), and the shaft portion (20) are integrally formed in the outer joint member (14). Face splines (19a, 13a) are formed at the respective end faces of the shoulder portion (19) of the outer joint member (14) and the caulked portion (13). The face splines (19, 13a) are supported with pressure by a fastening bolt (21) that abuts an outer side end face of the wheel hub (1). The bolt (21) is threadedly connected to the internal thread (20a)of the shaft portion (20a). The double row rolling bearing (2) and the constant velocity universal joint (3) are coupled together in such a way that they can transmit torque and are axially separable. The face spline (13a) of the caulked portion (13) is formed by plastic deformation while the caulked portion (13) is formed. Compressive remaining stress is placed on the surfaces of the face splines (13a, 19a) as a result of a surface modification by shot peening. The surface hardness is set at 300 Hv or more.

Hereinafter, embodiments of the present disclosure will be described in detail based on the drawings.

FIG. 1 is a longitudinal section view of a first embodiment of a driving wheel bearing apparatus. FIG. 2 is a longitudinal section view of a bearing unit of FIG. 1. FIG. 3 is a longitudinal section view of a constant velocity universal joint of FIG. 1. Incidentally, in the following description, when the apparatus is mounted on a vehicle, a side that is positioned rather near the outside of a vehicle is referred to as an outer side (a left-hand side of FIG. 1). A side that is positioned rather near the center of the vehicle is referred to as an inner side (a right-hand side of FIG. 1).

This driving wheel bearing apparatus has a structure that is described as a so-called third generation. A wheel hub 1, a double row rolling bearing 2, and a constant velocity universal joint 3 are detachably unitized. The double row rolling bearing 2 includes an outer member 7, an inner member 8, and double row rolling elements (balls) 9 and 9.

The outer member 7 is made of medium/high carbon steel containing 0.40 to 0.80 wt % of carbon. The medium/high carbon steel is such as S53C. The outer member 7 has a body mounting flange 7b to be mounted on a car body (not shown). The body mounting flange 7b is integrally formed on the outer circumference of the outer member 7. The outer member 7 is integrally formed with double row outer raceway surfaces 7a and 7a on its inner circumference. In addition, at least the double row outer raceway surfaces 7a and 7a are hardened by high frequency induction quenching to have a surface hardness of 58 to 64 HRC.

The inner member 8 has double row inner raceway surfaces 1a and 5a. The double row inner raceway surfaces 1a and 5a are arranged opposite to the outer raceway surfaces 7a and 7a of the outer member 7. The inner raceway surface 1a (outer side) is integrally formed with the outer circumference of the wheel hub 1. The inner raceway surface 5a (inner side) is integrally formed with the outer circumference of the inner ring 5. In this case, the inner member 8 includes the wheel hub 1 and the inner ring 5. In addition, the double row rolling elements 9 and 9 are contained between the raceway surfaces, and are rollably held by cages 10 and 10. Seals 11 and 12 are mounted on the opening of an annular space formed between the outer member 7 and the inner member 8. The seals 11, 12 prevent leakage of grease contained in the bearing and entry of rainwater, dust, etc. into the bearing from the outside.

As shown in an enlarged view of FIG. 2, the wheel hub 1 has a wheel mounting flange 4 for mounting a wheel (not shown). The wheel mounting flange 4 is integrally formed at an outer side end of the wheel hub. The inner raceway surface 1a is formed on the outer circumference of the wheel hub 1. A cylindrical portion 1b axially extends from the inner raceway surface 1a. The wheel hub 1 is made of medium/high carbon steel containing 0.40 to 0.80 wt % of carbon. The medium/high carbon steel is such as S53C. An outer circumference surface, that includes the inner raceway surface 1a, from an inner side base 4a of the wheel mounting flange 4, the base 4a serving as a seal land portion of the outer side seal 11, to the cylindrical portion 1b is hardened by high frequency induction quenching to have a surface hardness of 58 to 64 HRC. This not only increases the wear resistance of the seal land portion, but also further increases the durability of the wheel hub 1. Thus, the wheel hub 1 has adequate mechanical strength for a rotary bending load imposed on the wheel mounting flange 4. Incidentally, the inner ring 5 and the rolling element 9 are made of high-carbon chromium steel such as SUJ2. They are hardened to the core by quenching to have a hardness of 58 to 64 HRC.

The inner ring 5 is press-fit onto the cylindrical portion 1b of the wheel hub 1, via a predetermined interference. The inner ring 5 is axially secured with an intended bearing preload imposed by a caulked portion 13. The caulking portion 13 is formed by plastically deforming the end of the cylindrical portion 1b. A face spline 13a is formed by plastic deformation at the end face of the caulked portion 13 when oscillating caulking is performed. The double row angular ball bearing, using a ball as the rolling element 9, is shown. However, the embodiment is not limited to balls. A double row tapered roller bearing, using a tapered roller as the rolling element 9, may be used.

As shown in an enlarged view of FIG. 3, the constant velocity universal joint 3 is formed with an outer joint member 14, a joint inner ring 15, a cage 16, and a torque transmission ball 17. The outer joint member 14 has a cup-shaped mouth portion 18. A shoulder portion 19 forms the bottom of the mouth portion 18. A cylindrical shaft portion 20 axially extends from the shoulder portion 19. Curved, axially extending track grooves 18a and 15a are formed on the inner circumference of the mouth portion 18 and the outer circumference of the joint inner ring 15, respectively. The end face of the shoulder portion 19 includes a face spline 19a that engages the face spline 13a of the caulked portion 13. An internal thread 20a is formed in the shaft portion 20. The outer joint member 14 is made of medium/high carbon steel containing 0.40 to 0.80 wt % of carbon. The medium/high carbon steel is such as S53C. The track groove 18a is hardened by high frequency induction quenching to have a surface hardness of 58 to 64 HRC.

As shown in FIG. 1, a fastening bolt 21 is threadedly connected to the internal thread 20a of the shaft portion 20. The face splines 19a and 13a of the shoulder portion 19 of the outer joint member 14 and the caulked portion 13 of the wheel hub 1 are arranged opposite to each other and are supported with pressure by the fastening bolt 21. The double row rolling bearing 2 and the constant velocity universal joint 3 are thus detachably unitized. In this embodiment, a smaller-diameter portion 1c is arranged in the inside diameter of the wheel hub 1. The fastening bolt 21 is inserted, via a predetermined guiding clearance, into the portion 1c. Thus, it is possible to easily perform centering of the outer joint member 14 and the inner member 8. This simplifies assembly and disassembly operations of the apparatus and enables the face splines 19a and 13a to engage with no circumferential and axial looseness or play.

Here, compressive remaining stress is placed on the face spline 13a of the caulked portion 13 and the face spline 19a of the shoulder portion 19 of the outer joint member 14 as a result of surface modification by shot peening. This makes it possible to increase fatigue strength while keeping an intended shape and size without deformation caused by heat treatment. As a shot grain, a steel ball having a grain size of several tens of micrometers to 0.1 mm is used. In addition to a steel ball, nonferrous shot such as ceramic may be used. Incidentally, shot peening is performed under the following conditions: the pressure is 0.4 MPa, the processing time is 20 seconds, and the injection distance is 100 mm.

In the test conducted by the applicant by using test pieces including S53C to S55C, it has been found that, although compressive remaining stress slightly differs depending on the shot grain or projection condition, it is possible to form compressive remaining stress of 500 MPa on the surface by setting the surface hardness of a surface on which stress is formed at at least about 300 HV. Thus, it is possible to form compressive remaining stress of about 1000 MPa on the uppermost surface layer by setting the surface hardness at 520 HV or more. This enables the face spline 13a to also be formed by plastic deformation of the caulked portion 13. Thus, even when tensile residual stress is produced on the surface, compressive remaining stress is adequately formed on that surface. As a result, it is possible to maximize the mechanical strength and the fatigue strength of the material.

Moreover, in addition to shot peening, as a means for providing compressive remaining stress, WPC (wide peening cleaning) by which shot grains are made finer than those in shot peening and are made to hit a surface on which stress is formed at higher speed can be taken up, as an example. The WPC makes it possible to further increase the fatigue strength and wear resistance and provide a high-quality, high-reliability driving wheel bearing apparatus.

The surfaces of the face splines 13a and 19a may be hardened by laser hardening. By doing so, it is possible to prevent deformation due to heat treatment and increase the strength and wear resistance of the tooth surfaces of the face splines 13a and 19a. This makes it possible to increase the reliability over a long period of time.

Incidentally, as mentioned earlier, both the face splines 13a and 19a may be hardened by shot peening, WPC, or laser hardening; however, the embodiment is not limited thereto. Shot peening, WPC, and laser hardening may be appropriately performed in combination. For example, the surface of the face spline 13a of the caulked portion 13 may be hardened by laser hardening, and shot peening may be performed on the face spline 19a of the shoulder portion 19.

FIG. 4 is a longitudinal section view of a second embodiment of the driving wheel bearing apparatus. FIG. 5 is a longitudinal section view of a bearing unit of FIG. 4. This embodiment differs from the first embodiment, described above, basically only in the structure of the double row rolling bearing. Therefore, such components and parts that find their identical or functionally equivalent counterparts in the first embodiment are identified with the same reference numerals, and detailed description of them will be omitted.

This driving wheel bearing apparatus has a structure that is described as a so-called third generation. A wheel hub 22, a double row rolling bearing 23, and a constant velocity universal joint 3 are detachably unitized. The double row rolling bearing 23 includes an outer member 7, an inner member 24, and double row rolling elements 9 and 9.

As shown in an enlarged view of FIG. 5, the inner member 24 includes double row inner raceway surfaces 1a and 5a arranged opposite to outer raceway surfaces 7a and 7a of the outer member 7. The inner raceway surface 1a (outer side) is integrally formed with the outer circumference of the wheel hub 22, and the inner raceway surface 5a (inner side) is formed integrally with the outer circumference of an inner ring member 25. In this case, the inner member 24 includes the wheel hub 22 and the inner ring member 25.

The wheel hub 22 has a wheel mounting flange 4 integrally formed at an outer side end of the wheel hub 22. The inner raceway surface 1a is formed on the outer circumference of the wheel hub 22. A cylindrical portion 22a axially extends from the inner raceway surface 1a. The inner circumference of the cylindrical portion 22 includes an irregular portion 26 (crosshatched in the drawing) hardened, by high frequency induction quenching, to have a surface hardness of 58 to 64 HRC. The irregular portion 26 is formed in the shape of a crisscross pattern knurls. It includes crossing grooves formed by making a plurality of annular grooves that are independently formed by turning or the like. A plurality of axial grooves, that are formed by broaching or the like, intersect at nearly right angles, or crossing grooves are formed by inclined spiral grooves. The tip of the convex portion of the irregular portion 26 is made to have a shape of a spire, such as a triangle, in order to ensure a good bite.

The wheel hub 22 is made of medium/high carbon steel containing 0.40 to 0.80 wt % of carbon. The medium/high carbon steel is such as S53C. An outer circumference surface, that includes the inner raceway surface 1a, from an inner side base 4a of the wheel mounting flange 4 to the cylindrical portion 22a, is hardened by high frequency induction quenching to have a surface hardness of 58 to 64 HRC (crosshatched in the drawing). This not only increases the wear resistance of the base 4a, the seal land portion, of the wheel mounting flange 4, but also further increases the durability of the wheel hub 22. Thus, the wheel hub 22 has adequate mechanical strength for a rotary bending load imposed on the wheel mounting flange 4.

The inner ring member 25 is integrally formed with a cylindrical part 27 that axially extends from the inner raceway surface 5a. The cylindrical part 27 is formed as a spigot portion 27a and a fit portion 27. The spigot portion 27a is fit into the cylindrical portion 22a of the wheel hub 22, via a predetermined interference. The fit portion 27b is formed at the end of the spigot portion 27a. Also, the fit portion 27b is arranged opposite to the irregular portion 26 of the wheel hub 22. A step portion 28 is formed at the inner side end face of the inner ring member 25. A face spline 25a is formed at the end face of the step portion 28. The inner ring member 25 is made of medium/high carbon steel containing 0.40 to 0.80 wt % of carbon. The medium/high carbon steel is such as S53C. A region from the inner raceway surface 5a to the spigot portion 27a is hardened by high frequency induction quenching to have a surface hardness of 58 to 64 HRC (crosshatched in the drawing). The hardness of the fit portion 27b remains the same as a material hardness obtained after it is forged.

The wheel hub 22 and the inner ring member 25 are plastically integrally coupled together with an intended bearing preload imposed by caulking. The fit portion 27b is made to bite into the irregular portion 26 of the wheel hub 22. It is caulked by fitting the cylindrical part 27 of the inner ring member 25 into the wheel hub 22 and, at the same time, enlarging the diameter of the fit portion 27b by squeezing a diameter enlarging jig, such as a mandrel, into the fit portion 27b. This eliminates the need to manage the amount of preload by tightly fastening them with a nut or the like as in the prior art. Therefore, it is possible to realize a reduction in weight and size, increase the strength and durability of the wheel hub 22, and maintain the amount of preload for long periods of time.

The inner ring member 25, including the face spline 25a, is formed by cold forging. Turning is performed to obtain a predetermined shape and size. After heat treatment is performed on a predetermined part, compressive remaining stress is placed on the face spline 25a as a result of surface modification by shot peening. Thereafter, grinding is performed on at least the inner raceway surface 5a. As a result, it is possible to prevent problems caused by forming the face spline 13a in finished goods while forming the caulked portion 13 as in the first embodiment described above. Thus, variations due to a gap between the teeth of the face spline 13a or repeated working or a reduction in durability due to hoop stress produced in the inner ring 5 are prevented. This makes it possible to provide higher reliability and prevent an increase in costs resulting from the disposal of the finished goods due to the above problems.

Here, as shown in FIG. 4, a fastening bolt 21 is threadedly connected to the internal thread 20a of the shaft portion 20. The face splines 19a and 25a of the outer joint member 14 and the inner member 24, arranged opposite to each other, are supported with pressure by the fastening bolt 21. A spacer 29 is placed between the bolt 21 and the wheel hub 22. The double row rolling bearing 23 and the constant velocity universal joint 3 are detachably unitized. The spacer 29 is formed with a substantially L-shaped cross-sectional shape. It has a flange portion 29a that abuts the outer side end face of the wheel hub 22. A cylindrical part 29b is fit onto the fastening bolt 21. As a result, it is possible to easily perform centering of the outer joint member 14 and the inner member 24 by the spacer 29. This simplifies assembly and disassembly operations of the apparatus. In addition, the face splines 19a and 25a can engage with no circumferential and axial looseness or play.

As described above, since the face spline 25a has no looseness, due to the spacer 29, and compressive remaining stress is placed thereon as a result of surface modification by shot peening, the face spline 25a hardly wears after repeated contact. The face spline 25a is formed by cold forging to enhance yield; however, the embodiment is not limited. The face spline 25a may be formed by turning after the inner ring member 25 is molded by hot forging. The face spline 25a may be formed by plastic deformation such as orbital forging after being subjected to turning.

FIG. 6 is a longitudinal section view of a third embodiment of the driving wheel bearing apparatus. FIG. 7 is a longitudinal section view of a bearing unit of FIG. 6. It is to be noted that components and parts that find their identical or functionally equivalent counterparts in the above-described embodiments are identified with the same reference numerals, and a detailed description will be omitted.

As shown in FIG. 6, the driving wheel bearing apparatus has a structure, which is described as a third generation. A wheel hub 30, a double row rolling bearing 31, and a constant velocity universal joint 3 are detachably unitized. As shown in an enlarged view of FIG. 7, the double row rolling bearing 31 includes an outer member 7, an inner member 32, and double row rolling elements 9 and 9. The inner member 32 includes the wheel hub 30 and an inner ring member 33 fit into the wheel hub 30. Double row inner raceway surfaces 1a and 5a, formed on the inner member 32, are arranged opposite to outer raceway surfaces 7a and 7a of the outer member 7.

The wheel hub 30 has a wheel mounting flange 4 integrally formed at the outer side end of the wheel hub 30. The inner raceway surface 1a is formed on the outer circumference. A cylindrical portion 22a axially extends from the inner raceway surface 1a. The wheel hub 30 is made of medium/high carbon steel containing 0.40 to 0.80 wt % of carbon. The medium/high carbon steel is such as S53C. An outer circumference surface, that includes the inner raceway surface 1a, from an inner side base 4a of the wheel mounting flange 4 to the cylindrical portion 22a, and an inner circumference surface are hardened by high frequency induction quenching to have a surface hardness of 58 to 64 HRC (only a hardened portion of the inner circumference surface is crosshatched in the drawing).

The inner ring member 33 is integrally formed with a cylindrical part 34 axially extending from the inner raceway surface 5a. In addition, the inner ring member 33 and the wheel hub 30 are integrally plastically coupled together. A predetermined bearing preload is imposed by a caulked portion 34a. The caulked portion 34a is formed by plastically deforming the end of the cylindrical part 34 radially outward. The inner ring member 33 is made of medium/high carbon steel containing 0.40 to 0.80 wt % of carbon. The medium/high carbon steel is such as S53C. An outside diameter surface from the inner raceway surface 5a to the cylindrical part 34 is hardened by high frequency induction quenching to have a surface hardness of 58 to 64 HRC (crosshatched in the drawing). The hardness of the end of the cylindrical part 34, subjected to plastic deformation, remains the same as the material hardness obtained after it is forged. The hardness of the caulked portion 34a is set at 15 to 35 HRC, including plastic hardening. This makes it possible to easily perform plastic deformation and prevent the generation of microcracks associated with the plastic deformation. At the same time, it is possible to ensure the strength of the caulked portion 34a and maintain tight bonding for long periods of time.

In this embodiment, the inner ring member 33, including the face spline 25a, is formed by cold forging. Then, turning is performed to obtain a predetermined shape and size. After heat treatment is performed on a predetermined part, shot peening is performed on the face spline 25a. Grinding is performed at least on the inner raceway surface 5a.

As shown in FIG. 6, a fastening bolt 21 is threadedly connected to the internal thread 20a of a shaft portion 20. The face splines 19a and 25a of the outer joint member 14 and the inner member 32, arranged opposite to each other, are supported with pressure by the fastening bolt 21. The double row rolling bearing 31 and the constant velocity universal joint 3 are detachably unitized.

A spacer 35 is formed with a substantially L-shaped cross-sectional shape. The spacer 35 has a flange portion 35a that abuts the end face of the caulked portion 34a. A cylindrical part 35b is fit onto the fastening bolt 21. As a result, it is possible to easily perform centering of the outer joint member 14 and the inner member 32 by the spacer 35. This simplifies assembly and disassembly operations of the apparatus. In addition, it is possible to replace the double row rolling bearing and the constant velocity universal joint separately with a new one without replacing them as a unit as in a fourth-generation structure. Thus, this contributes to a total cost reduction.

FIG. 8 is a longitudinal section view of a fourth embodiment of the driving wheel bearing apparatus. This embodiment differs from the third embodiment (FIG. 6) described above basically only in part of the structure of the inner ring member. Therefore, such components and parts that find their identical or functionally equivalent counterparts in the third embodiment are identified with the same reference numerals, and detailed description will be omitted.

This driving wheel bearing apparatus has a structure that which is described as a third generation. A wheel hub 30, a double row rolling bearing 36, and a constant velocity universal joint 3 are detachably unitized. The double row rolling bearing 36 includes an outer member 7, an inner member 37, and double row rolling elements 9 and 9. The inner member 37 includes the wheel hub 30 and an inner ring member 38 fit into the wheel hub 30. The inner member 27 has inner raceway surfaces 1a, 5a formed on its outer circumference. The double row inner raceway surfaces 1a and 5a are arranged opposite to outer raceway surfaces 7a and 7a of the outer member 7.

The inner ring member 38 is integrally formed with a cylindrical part 39 that axially extends from the inner raceway surface 5a. In addition, the inner ring member 38 and the wheel hub 30 are integrally plastically coupled together. A predetermined bearing preload is imposed by a caulked portion 34a. The caulked portion 34a is formed by plastically deforming the end of the cylindrical part 39 radially outward. The inner ring member 38 is made of medium/high carbon steel containing 0.40 to 0.80 wt % of carbon. The medium/high carbon steel is such as S53C. An outside diameter surface, from the inner raceway surface 5a to the cylindrical part 39, is hardened by high frequency induction quenching to have a surface hardness of 58 to 64 HRC (crosshatched in the drawing).

The inner circumference of the cylindrical part 39 of the inner ring member 38 includes a guide portion 39a. The guide portion 39a projects radially inward. A fastening bolt 40 is placed through the guide portion 39a and is threadedly connected to an internal thread 20a of the shaft portion 20. The face splines 19a and 25a of the outer joint member 14 and the inner member 37 are supported with pressure by the fastening bolt 40. The double row rolling bearing 36 and the constant velocity universal joint 3 are detachably unitized. As a result, unlike the embodiments described above, it is possible to perform centering of the outer joint member 14 and the inner member 37 without mounting spacers 29 and 35 and thereby simplify assembly and disassembly operations of the apparatus.

FIG. 9 is a longitudinal section view of a fifth embodiment of the driving wheel bearing apparatus. FIG. 10 is a longitudinal section view of a bearing unit of FIG. 9. FIG. 11 is a longitudinal section view of a bearing unit of FIG. 10 before oscillating caulking. FIG. 12 is an enlarged view of the principal portion of FIG. 11. FIG. 13 is an enlarged view of the principal portion showing a modified example of FIG. 12. This embodiment differs from the first embodiment (FIG. 1) described earlier basically only in part of the structure of the inner member. Therefore such components and parts that find their identical or functionally equivalent counterparts in the first embodiment are identified with the same reference numerals, and a detailed description thereof will be omitted.

This driving wheel bearing apparatus has a structure that is described as a so-called third generation. A wheel hub 41 and a double row rolling bearing 42 are unitized and are detachably axially connected to a constant velocity universal joint 3. The double row rolling bearing 42 includes an outer member 7, an inner member 43, and double row rolling elements 9 and 9.

The outer member 7 is made of medium/high carbon steel containing 0.40 to 0.80 wt % of carbon. The medium/high carbon steel is such as S53C. A body mounting flange 7b, to be mounted on a car body (not shown), is integrally formed on the outer circumference of the outer member 7. The outer member 7 is integrally formed with double row outer raceway surfaces 7a and 7a on its inner circumference. At least the double row outer raceway surfaces 7a and 7a have been formed with a predetermined hardened layer hardened by high frequency induction quenching to have a surface hardness of 58 to 64 HRC (crosshatched in FIG. 11).

The inner member 43 includes double row inner raceway surfaces 1a and 5a arranged opposite to the outer raceway surfaces 7a and 7a of the outer member 7. The inner raceway surface 1a (outer side) is directly formed on the outer circumference of the wheel hub 41. The inner raceway surface 5a (inner side) is formed on the outer circumference of the inner ring 5. In this case, the inner member 43 includes the wheel hub 41 and the inner ring 5. In addition, the double row rolling elements 9 and 9 are contained between the raceway surfaces, and are rollably held by cages 10 and 10.

As shown in an enlarged view of FIG. 10, the wheel hub 41 has a wheel mounting flange 4 integrally formed on its outer side end. An inner raceway surface 1a is formed on the outer circumference. A cylindrical portion 1b axially extends from the inner raceway surface 1a. The wheel hub 41 is made of medium/high carbon steel containing 0.40 to 0.80 wt % of carbon. The medium/high carbon steel is such as S53C. An outer circumference surface from an inner side base 4a of the wheel mounting flange 4, the base 4a serving as a seal land portion of an outer side seal 11, to the cylindrical portion 1b, has a hardened layer 46 hardened by high frequency induction quenching to have a surface hardness of 58 to 64 HRC (crosshatched in FIG. 11). The surface hardness of the inner raceway surface 1a is set at 58 to 64 HRC. The hardness of a caulked portion 13, which will be described later, remains the same as a hardness (13 to 30 HRC) obtained after it is forged. This not only increases the wear resistance of the seal land portion, but also further increases the durability of the wheel hub 41. Thus, the wheel hub 41 has adequate mechanical strength for a rotary bending load imposed on the wheel mounting flange 4.

Face splines 19a and 13a of a shoulder portion 19 of an outer joint member 14 and the caulked portion 13 of the wheel hub 41, arranged opposite to each other, are supported with pressure as a result of a fastening bolt 21 threadedly connected to an internal thread 20a of a shaft portion 20 as shown in FIG. 9. Thus, the double row rolling bearing 42 and the constant velocity universal joint 3 are detachably unitized.

As shown in FIG. 11, the cylindrical portion 1b of the wheel hub 41 is formed as a cylindrical part 44. The cylindrical part 44 has a nearly uniform thickness before plastic deformation. Circular arc chamfered portions 44a and 44b are formed at the end of the cylindrical part 44. In addition, as shown in an enlarged view of FIG. 12, a chamfered portion 5c, having a circular arc surface with a radius of curvature ri of R1.0 to 2.5 mm, is formed at the inside diameter end on the larger end face 5b side (the caulked portion side) of the inner ring 5. If the radius of curvature ri of the chamfered portion 5c is set at a value smaller than 1.0 mm, there is a possibility that stress concentration occurs at the root of the caulked portion 13, when a bending moment load is imposed on the apparatus while the vehicle is being operated, causes damage such as microcracks. Conversely, if the radius of curvature ri exceeds 2.5 mm, it is undesirable because the inner ring 5 is widened radially outward when the cylindrical part 44 is plastically deformed, producing excessive hoop stress on the outside diameter of the inner ring 5.

An annular groove (undercut) 45 with a depth t is formed on the outer circumference surface of the cylindrical part 44. The annular groove 45 is formed in an area ranging from a position corresponding to the larger diameter end of the inner raceway surface 5a in the inner ring 5 to the chamfered portion 5c of the inner ring 5, the area that slightly spreads over the larger end face 5b. In addition, a circular arc surface 45a, having a radius of curvature Ri, and a circular arc surface 45b, having a radius of curvature Ro, are formed at the sides of the annular groove 45.

In this embodiment, the depth t of the annular groove 45 is set at 0.5 to 2.0 mm. The radius of curvature Ri of the inner side circular arc surface 45a is set so as to be greater than the radius of curvature ri of the chamfered portion 5c of the inner ring 5 and smaller than the radius of curvature Ro of the outer side circular arc surface 45b (ri≦Ri ≦Ro), and Ri=R1 to 10 mm. As described above, by forming the annular groove 45 on the outer circumference surface of the cylindrical part 44, the cylindrical part 44 is easily deformed when caulking is performed. Thus, this makes it possible to prevent the deformation of the inner ring 5. However, the effectiveness is reduced if the depth t of the annular groove 45 is smaller than 0.5 mm. If the depth t exceeds 2.0 mm, the inner ring is squeezed by an inadequate amount of material. This makes it impossible to obtain the intended power by which the inner ring 5 is fixed. That is, after caulking, although part of the annular groove 45 is brought into intimate contact with the chamfered portion 5c of the inner ring 5, the space of the annular groove 45 remains.

The inner side edge of the hardened layer 46, formed on the outer circumference of the wheel hub 41, is placed within an area from the starting point of the outer side circular arc surface 45b in the annular groove 45 up to 4.0 mm on the outer side. On the inner side, it is placed up to 3.0 mm in an area of the circular arc surface 45b, the area in the annular groove 45. By placing the position of the inner side edge of the hardened layer 46 in the above-described area, the amount by which the diameter of the inner ring fit portion of the cylindrical portion 1$b$ is widened by caulking is decreased. This, this makes it possible to reduce the hoop stress of the inner ring 5. Furthermore, the starting position of the widened-diameter part can be brought closer to the caulked portion 13. Thus, this makes it possible to improve the caulking workability of the cylindrical part 44 in the cylindrical portion 1$b$. By placing the inner side edge of the hardened layer 46 within an area of the circular arc surface 45$b$, it is possible to prevent cracks or the like from developing by the plastic deformation of the hardened layer 46.

In this embodiment, the end of the cylindrical portion 1$b$ in the wheel hub 41, before caulking, is formed as the hollow cylindrical part 44. The annular groove 45, with a predetermined depth t, is formed on the outer circumference surface of the cylindrical part 44. The circular arc surface 45$a$, having a predetermined radius of curvature Ri, and the circular arc surface 45$b$, having a predetermined radius of curvature Ro, are formed on the sides of the annular groove 45. The width of the annular groove 45 is set within a predetermined range. Thus, it is possible to provide a driving wheel bearing apparatus where the cylindrical part 44 is easily deformed at the time of caulking. Thus, the intended shape and size of the face spline 13$a$ is obtained. The inner ring 5 is squeezed by an intended amount. The apparatus increases its durability by preventing the deformation of the inner ring 5 associated with oscillating caulking.

FIG. 13 is a modified example of the cylindrical part 44 shown in FIG. 12. This embodiment differs from the embodiment described above basically only in the shape of the annular groove. Therefore such components and parts that find their identical counterparts in the embodiment described above are identified with the same reference numerals, and overlapping description will be omitted.

The cylindrical portion 1$b$ of the wheel hub 41 is formed as a cylindrical part 44 having a nearly uniform thickness before plastic deformation. An annular groove 45' with a depth t is formed on the outer circumference surface of the cylindrical part 44. The annular groove 45' is formed in an area ranging from a position corresponding to the larger diameter end of the inner raceway surface 5$a$ in the inner ring 5 to the chamfered portion 5$c$ of the inner ring 5, the area that slightly spreads over the larger end face 5$b$. In addition, a circular arc surface 45$a$, having a radius of curvature Ri, and a circular arc surface, having a radius of curvature Ro, are formed at the sides of the annular groove 45'.

The bottom of the annular groove 45' is formed as a tapered face with a diameter that gradually decreases toward the tip of the cylindrical part 44. The angle of inclination θ of the tapered face is set at 15° or less, more preferably, at 10° or less. As a result, it is possible to further reduce the hoop stress produced in the inner ring 5 at the time of oscillating caulking. An angle of inclination θ of more than 15° is undesirable because this makes the cylindrical part 44 thinner and causes strength reduction.

FIG. 14 is a longitudinal section view of a sixth embodiment of the driving wheel bearing apparatus. This embodiment differs from the fifth embodiment described above basically only in the structure of the double row rolling bearing. Therefore, such components and parts that find their identical or functionally equivalent counterparts in the fifth embodiment are identified with the same reference numerals, and a detailed description will be omitted.

This driving wheel bearing apparatus has a structure that is described as a so-called second generation. A wheel hub 47 and a wheel bearing 48, formed of a double row rolling bearing, are secured to the wheel hub 47. The wheel bearing 48 has a body mounting flange 7$b$ integrally formed on the outer circumference of the outer member 7. The outer member 7 integrally formed with double row outer raceway surfaces 7$a$ and 7$a$ on its inner circumference. Two inner rings 49 and 5 are formed with inner raceway surfaces 5$a$ and 5$a$ on their outer circumference. The inner raceway surfaces 5$a$ and 5$a$ are arranged opposite to the double row outer raceway surfaces 7$a$ and 7$a$. Double row rolling elements 9 and 9 are rollably contained between the raceway surfaces with cages 10 and 10 placed between them. Seals 50 and 12 are mounted on the opening of an annular space formed between the outer member 7 and the two inner rings 49 and 5. The seals 50, 12 prevent leakage of grease contained in the bearing and the entry of rainwater, dust, etc. into the bearing from the outside.

The wheel hub 47 has a wheel mounting flange 4 integrally formed at its outer side end. A cylindrical portion 47$b$ axially extends from the wheel mounting flange 4, via the shoulder portion 47$a$. In addition, the wheel bearing 48 is press-fit onto the cylindrical portion 47$b$ of the wheel hub 47, via a predetermined interference, until the wheel bearing 48 abuts the shoulder portion 47$a$. The wheel bearing 48 is axially secured in a state where an intended bearing preload is imposed by a caulked portion 51. The caulked portion 51 is formed by plastically deforming the end of the cylindrical portion 47$b$. In addition, on the end face of the caulked portion 51, a face spline 51$a$ is formed by cutting after oscillating caulking.

The wheel hub 47 is made of medium/high carbon steel containing 0.40 to 0.80 wt % of carbon. The medium/high carbon steel is such as S53C. An outer circumference surface from the shoulder portion 47$a$ of the wheel mounting flange 4 to the cylindrical portion 47$b$, includes a hardened layer 52 hardened by high frequency induction quenching to have a surface hardness of 50 to 64 HRC (crosshatched in the drawing). The hardness of the caulked portion 51 remains the same as a hardness obtained after it is forged. This increases the durability of the wheel hub 47. Thus, the wheel hub 47 has adequate mechanical strength for a rotary bending load imposed on the wheel mounting flange 4. This makes it possible to easily perform plastic deformation of the caulked portion 51 and cutting of the face spline 51$a$.

In this embodiment, as is the case with the embodiment described above, the end of the cylindrical portion 47$b$ in the pre-caulking wheel hub 47 is formed as a hollow cylindrical part. The annular groove 45 is formed on an outer circumference surface of the cylindrical part. The width of the annular groove 45 is set within a predetermined range. The cylindrical part is easily deformed at the time of caulking. The amount by which the inner ring 5 is squeezed is ensured. Thus, deformation of the inner ring 5 associated with oscillating caulking can be prevented.

The width dimension of the inner ring 5 on the caulking side (inner side), the inner ring 5 of the two inner rings 49 and 5, is made longer than the width dimension of the outer side inner ring 49. Specifically, the positions of the inner raceway surfaces 5$a$ are the same. The dimension Wi from the larger diameter end of the inner raceway surface 5$a$ to the larger end face 5$b$ is made longer than the dimension Wo from the larger diameter end of the inner raceway surface 5$a$ of the inner ring 49 to the larger end face 5$b$. This makes it possible to prevent the deformation of the inner ring 5 on the caulking side, the deformation which would appear at the time of oscillating caulking.

FIG. 15 is a longitudinal section view of a seventh embodiment of the driving wheel bearing. FIG. 16 is a longitudinal section view of a bearing unit of FIG. 15. FIG. 17 is an enlarged view of the principal portion showing a seal portion of FIG. 15. FIG. 18 is an enlarged view of the principal portion illustrating a modified example of a seal of FIG. 17.

This embodiment differs from the first embodiment (FIG. 1) described earlier basically only in the presence or absence of the exterior seal. Therefore such components and parts that find their identical or functionally equivalent counterparts in the first embodiment are identified with the same reference numerals, and a detailed description will be omitted.

This driving wheel bearing apparatus has a structure that is described as a so-called third generation. A wheel hub 1, a double row rolling bearing 2, and a constant velocity universal joint 3 are detachably unitized.

As shown in an enlarged view of FIG. 16, the double row rolling bearing 2 includes an outer member 7, an inner member 8, and double row rolling elements 9 and 9. The inner member 8 includes double row inner raceway surfaces 1a and 5a arranged opposite to the outer raceway surfaces 7a and 7a of the outer member 7. The inner raceway surface 1a (outer side) is integrally formed with the outer circumference of the wheel hub 1. The inner raceway surface 5a (inner side) is integrally formed with the outer circumference of the inner ring 5. In this case, the inner member 8 includes the wheel hub 1 and the inner ring 5.

In this embodiment, as shown in FIG. 15, a stepped portion 53 is formed in a shoulder portion 19 of an outer joint member 14. On the outside diameter of the inner ring 5, an exterior seal 54 is mounted. The exterior seal 54 seals an engaging portion of the face splines 19a and 13a described above. As shown in an enlarged view of FIG. 17, the exterior seal 54 includes a metal core 55 that is formed with a cylindrical part 55a press-fit onto the outside diameter of the inner ring 5. An inside diameter portion 55b extends from the cylindrical part 55a radially inward. A seal member 56 is integrally bonded to the metal core 55 by cure adhesion or the like.

The metal core 55 is made of an anticorrosive steel sheet such as an austenitic stainless steel sheet (such as SUS304 in the JIS), a ferritic stainless steel sheet (such as SUS430 in the JIS), and an anticorrosive cold-rolled steel plate sheet (such as SPCC in the JIS). The metal core 55 has a substantially L-shaped cross-sectional shape formed by press working. The seal member 56 is made of synthetic rubber such as nitrile rubber. The seal member 56 has a pair of side lips (axial lips) 56a and 56b that sidlingly extend radially outward, and a grease lip 56c. In addition, the seal lips 56a, 56b, and 56c make elastic contact with the stepped portion 53 of the shoulder portion 19. This makes it possible to prevent foreign matter such as rainwater and dust from entering, from the outside, into the engaging portion of the face splines 19a and 13a. The seal 54 prevents grease, that the engaging portion is filled with, from leaking out. Thus, this prevents the face splines 19a and 13a from corroding or wearing. Furthermore, even when dimensional variations occur due to a production error or an assembly error in the inner member 8 or the outer joint member 14, it is possible to obtain high sealing performance over a long period of time. This is due to the side lips 56a and 56b and the grease lip 56c having adequate elasticity.

FIG. 18 is an enlarged view of the principal portion showing a modified example of the exterior seal 54 described above. Components and parts that find their identical or functionally equivalent counterparts in the embodiment described above are identified with the same reference numerals, and a detailed description will be omitted.

This exterior seal 57 includes a metal core 55 that includes a cylindrical part 55a, an inside diameter portion 55b and a seal member 58. The cylindrical part 55a is press-fit onto the outside diameter of the inner ring 5. The inside diameter portion 55b extends radially inward from the cylindrical part 55a. The seal member 58 is integrally bonded to the metal core 55 by cure adhesion or the like. The seal member 58 is made of synthetic rubber such as nitrile rubber. The seal member 58 has an axial lip 58a with a circular arc tip. As a result, it is possible to prevent foreign matter such as rainwater and dust from the outside from entering the engaging portion of the face splines 19a and 13a. The seal 57 prevents grease, that the engaging portion is filled with, from leaking out. The exterior seal 57 can be simplified and made compact. The abutting portion of the axial lip 58a is formed to have a circular arc shape. Thus, when the wheel hub 1 or the outer joint member 14 is deformed, due to a heavy moment load imposed on it, the exterior seal 57 can follow that deformation appropriately, making it possible to obtain high sealing performance.

FIG. 19 is a longitudinal section view of an eighth embodiment of the driving wheel bearing apparatus. This embodiment has the same basic structure as the second embodiment (FIG. 4) described earlier and differs from the seventh embodiment (FIG. 15) basically only in the structure of the double row rolling bearing. Therefore, such components and parts that find their identical or functionally equivalent counterparts in the embodiments described above are identified with the same reference numerals, and a detailed description will be omitted.

A double row rolling bearing 23 includes an outer member 7, an inner member 24, and double row rolling elements 9 and 9. The inner member 24 includes a wheel hub 22 and an inner ring member 25 fit into the wheel hub 22.

The inner ring member 25 is integrally formed with a cylindrical part 27 axially extending from an inner raceway surface 5a. This cylindrical part 27 is formed of a spigot portion 27a and a fit portion 27b. The spigot portion 27a is fit into a cylindrical portion 22a of the wheel hub 22, via a predetermined interference. The fit portion 27b is formed at the end of the spigot portion 27a. The fit portion 27b is arranged opposite to an irregular portion 26 of the wheel hub 22. A face spline 25a is formed at an inner side end face of the inner ring member 25. The inner ring member 25 is made of medium/high carbon steel containing 0.40 to 0.80 wt % of carbon. The medium/high carbon steel is such as S53C. The inner ring member 25 is formed by cold forging or hot forging.

When cold forging is performed, the face spline 25a is formed while forging is performed, or the face spline 25a is formed after cold forging by cold plastic deformation, such as orbital working or by machining such as cutting. When hot forging is performed, the face spline 25a is formed after turning by cold plastic deformation, such as orbital working or by machining such as cutting. The inner ring member 25 is hardened by high frequency induction quenching, in a region from the inner raceway surface 5a to the spigot portion 27a, to have a surface hardness of 58 to 64 HRC. The fit portion 27b remains the same as a material hardness obtained after it is forged. The face spline 25a may be formed after high frequency induction quenching.

The wheel hub 22 and the inner ring member 25 are integrally plastically coupled together. An intended bearing preload is imposed by caulking by which the fit portion 27b is made to bite into the irregular portion 26 of the wheel hub 22. It is caulked by fitting the cylindrical part 27 of the inner ring member 25 into the wheel hub 22 and, at the same time, enlarging the diameter of the fit portion 27b by squeezing a diameter enlarging jig, such as a mandrel, into the fit portion 27b. This eliminates the need to manage the amount of preload by tightly fastening them with a nut or the like as in the prior art. Therefore, it is possible to realize a reduction in weight and size, increase the strength and durability of the wheel hub 22, and maintain the amount of preload for long periods of time.

A fastening bolt 21 is threadedly connected to an internal thread 20a of the shaft portion 20. Face splines 19a and 25a of a shoulder portion 19 of an outer joint member 14 and an inner side end face of the inner ring member 25, arranged opposite to each other, are supported with pressure by the fastening bolt 21. A spacer 29 is placed between the bolt 21 and the wheel hub 22. The double row rolling bearing 23 and the constant velocity universal joint 3 are detachably unitized. The spacer 29 is formed with a substantially L-shaped cross-sectional shape. A flange portion 29a abuts the outer side end face of the wheel hub 22. A cylindrical part 29b is fit onto the fastening bolt 21. As a result, it is possible to easily perform centering of the outer joint member 14 and the inner member 24 by the spacer 29. This simplifies assembly and disassembly operations of the apparatus. In addition, the face splines 19a and 25a can engage with no circumferential and axial looseness or play.

In addition, as is the case with the embodiment described above, the outside diameter of the inner ring 5 includes an exterior seal 54 to seal an engaging portion of the face splines 19a and 25a as described above. Seal lips 56a, 56b, and 56c make elastic contact with the stepped portion 53 of the shoulder portion 19. This makes it possible to prevent foreign matter, from the outside, such as rainwater and dust from entering the engaging portion of the face splines 19a and 25a. Also, the seal lips 56a, 56b, 56c prevent grease, that the engaging portion is filled with, from leaking out. Thus, this prevents the face splines 19a and 25a from corroding or wearing. Furthermore, even when dimensional variations occur due to a production error or an assembly error in the inner member 24 or the outer joint member 14, it is possible to obtain high sealing performance over a long period of time since the side lips 56a and 56b and the grease lip 56c have adequate elasticity.

FIG. 20 is a longitudinal section view of a ninth embodiment of the driving wheel bearing apparatus. This embodiment has the same basic structure as the third embodiment (FIG. 6) described earlier and differs from the seventh embodiment (FIG. 15) basically only in the structure of the double row rolling bearing. Therefore, such components and parts that find their identical or functionally equivalent counterparts in the embodiments described above are identified with the same reference numerals, and a detailed description will be omitted.

A double row rolling bearing 31 has an outer member 7, an inner member 32, and double row rolling elements 9 and 9. The inner member 32 includes a wheel hub 30 and an inner ring member 33 that are press-fit into the wheel hub 30 and secured via a predetermined interference. The inner ring member 33 and the wheel hub 30 are integrally plastically coupled together with a predetermined bearing preload imposed by a caulked portion 34a. The caulked portion 34a is formed by plastically deforming the end of the cylindrical part 34 radially outward.

Moreover, as is the case with the embodiments described earlier, the inner ring member 33, including the face spline 25a, is formed by cold forging or hot forging. However, thermal refining (high-temperature tempering after quenching) may be performed on the inner ring member 33 after it is forged. By performing thermal refining, it is possible to ensure low hardness and high toughness.

A fastening bolt 21 is threadedly connected to an internal thread 20a of the shaft portion 20. Face splines 19a and 25a of an outer joint member 14 and the inner ring member 33, arranged opposite to each other, are supported with pressure by the fastening bolt 21. A spacer 35 is placed between the bolt and inner member. The double row rolling bearing 31 and the constant velocity universal joint 3 are detachably unitized.

In this embodiment, the structure in which the inner ring member 33 is press-fit into the cylindrical portion 22a of the wheel hub 30 and secured to it is taken up as an example. The present disclosure is not limited to this structure. Though not shown in the drawing, the above two members may be secured to each other by means of a serration formed on the inner circumference of the wheel hub and a serration that engages the above serration formed in the cylindrical part of the inner ring member.

Though not shown in the drawing, the spacer described in the eighth and ninth embodiments, having a substantially L-shaped cross-sectional shape and being used with the fastening bolt, may be used in the seventh embodiment. That is, by doing away with the smaller-diameter portion on the inside diameter of the wheel hub, through which the fastening bolt is placed, makes the inside diameter portion of the wheel hub with a cylindrical shape. The flange portion of the spacer abuts on the outer side end face of the wheel hub. The cylindrical inside diameter portion of the wheel hub guides the cylindrical part of the spacer fit onto the fastening bolt. Thus, it is possible to easily perform centering of the outer joint member and the inner member. This simplifies assembly and disassembly operations of the apparatus. In addition, the face splines can engage with no circumferential and axial looseness or play. Thus, by doing away with the smaller-diameter portion, it is possible to achieve weight reduction of the product.

In addition, as is the case with the embodiment described above, an exterior seal 54 is mounted on the outside diameter of the inner ring 33. The exterior seal 54 seals an engaging portion of the face splines 19a and 25a as described above. Seal lips 56a, 56b, and 56c make elastic contact with a stepped portion 53 of a shoulder portion 19. This makes it possible to prevent foreign matter, from the outside, such as rainwater and dust from entering the engaging portion of the face splines 19a and 25a. The seal also prevents grease, that the engaging portion is filled with, from leaking out. Thus, this prevents the face splines 19a and 25a from corroding or wearing. Furthermore, even when dimensional variations occur due to a production error or an assembly error in the inner member 32 or the outer joint member 14, it is possible to obtain high sealing performance over a long period of time due to the side lips 56a and 56b and the grease lip 56c have adequate elasticity.

FIG. 21 is a longitudinal section view of a tenth embodiment of the driving wheel bearing apparatus. FIG. 22 is a longitudinal section view of a constant velocity universal joint of FIG. 21. FIG. 23 is an enlarged view of the principal portion of an exterior seal portion of FIG. 21. FIG. 24 is an enlarged view of the principal portion showing a modified example of an exterior seal of FIG. 23. FIG. 25 is an enlarged view of the principal portion showing another modified example of the exterior seal of FIG. 23. FIG. 26 is an enlarged view of the principal portion showing still another modified example. This embodiment differs from the seventh embodiment (FIG. 15) described earlier basically only in the structure of the exterior seal. Therefore such components and parts that find their identical or functionally equivalent counterparts in the embodiments described above are identified with the same reference numerals, and a detailed description will be omitted.

This driving wheel bearing apparatus has a structure that is described as a so-called third generation. A wheel hub 1, a double row rolling bearing 2, and a constant velocity universal joint 3 are detachably unitized. The double row rolling bearing 2 includes an outer member 7, an inner member 8, and double row rolling elements 9 and 9.

An exterior seal 59 for sealing an engaging portion of the face splines 19a and 13a described above is mounted on a shoulder portion 19 of an outer joint member 14. As shown in FIG. 22, the exterior seal 59 includes a cylindrical metal core 60 and a seal member 61. The cylindrical metal core 60 is press-fit onto the outside diameter of the shoulder portion 19. The seal member 61 is integrally bonded to the metal core 60 by cure adhesion or the like.

The metal core 60 is made of an anticorrosive steel sheet such as an austenitic stainless steel sheet (such as SUS304 in the JIS), a ferritic stainless steel sheet (such as SUS430 in the JIS), and an anticorrosive cold-rolled steel plate sheet (such as SPCC in the JIS). The metal core 60 has a substantially L-shaped cross-sectional shape formed by press working. The seal member 61 is made of synthetic rubber such as ACM and NBR. The seal member 61 has a pair of side lips (axial lips) 61a and 61b sidlingly bifurcating radially. In addition, as shown in an enlarged view of FIG. 23, the seal lips 61a and 61b make elastic contact with a larger end face 5b of an inner ring 5.

This makes it possible to prevent foreign matter, from the outside, such as rainwater and dust from entering the engaging portion of the face splines 19a and 13a. Also, the seal 61 prevents grease, that the engaging portion is filled with, from leaking out. Thus, this prevents the face splines 19a and 13a from corroding or wearing. Furthermore, even when dimensional variations occur due to a production error or an assembly error in the inner member 8 or the outer joint member 14, it is possible to obtain high sealing performance over a long period of time. This is due to the side lips 61a and 61b having adequate elasticity and making elastic contact with the larger end face 5b of the inner ring 5. The larger end face 5b has a predetermined surface roughness by grinding. In addition to the rubber described above, rubbers having excellent heat resistance such as HNBR (hydrogenated acrylonitrile-butadiene rubber), EPDM (ethylene propylene rubber) and FKM (fluorocarbon rubber), EPM (ethylene propylene rubber), silicon rubber can be used as the seal member 61.

FIG. 24 is an enlarged view of the principal portion showing a modified example of the exterior seal 59 described above. It is noted that such components and parts that find their identical or functionally equivalent counterparts in the embodiments described above are identified with the same reference numerals, and a detailed description will be omitted.

The exterior seal 62 includes a metal core 63 and a seal member 64. The metal core 63 is formed with a first cylindrical part 63a press-fit onto the outside diameter of the shoulder portion 19 of the outer joint member 14. An inclined portion 63b sidlingly extends from the first cylindrical part 63a radially outward. A second cylindrical part 63c axially extending from the inclined portion 63b. The seal member 64 is integrally bonded to the metal core 63 by cure adhesion or the like. The seal member 64 is made of synthetic rubber such as ACM or NBR. The seal member 64 has a pair of bifurcating radial lips 64a and 64b. The pair of radial lips 64a and 64b makes elastic contact with the outside diameter of the inner ring 5. This makes it possible to prevent foreign matter, from the outside, such as rainwater and dust, from entering the engaging portion of the face splines 19a and 13a. Also, the seal 64 prevents grease, that the engaging portion is filled with, from leaking out. Furthermore, since the exterior seal 62 has the pair of radial lips 64a and 64b, even when the wheel hub 1 or the outer joint member 14 is deformed due to a heavy moment load imposed on it, the exterior seal 62 can follow that deformation appropriately, making it possible to obtain high sealing performance.

FIG. 25 is an enlarged view of the principal portion showing another modified example of the exterior seal described above. It is noted that such components and parts that find their identical or functionally equivalent counterparts in the embodiment described above are identified with the same reference numerals, and a detailed description will be omitted.

This exterior seal 65 is formed of a cylindrical metal core 66 and a seal member 67. The cylindrical metal core 66 is press-fit onto the outside diameter of the shoulder portion 19 of the outer joint member 14. The seal member 67 is integrally bonded to the metal core 66 by cure adhesion or the like. The seal member 67 is made of synthetic rubber such as ACM or NBR. The seal member 67 has an axial lip 67a with a circular arc tip. The axial lip 67a makes elastic contact with the larger end face 5b of the inner ring 5. This makes it possible to prevent foreign matter, from the outside, such as rainwater and dust, from entering the engaging portion of the face splines 19a and 13a. Also, the seal member 67 prevents grease, that the engaging portion is filled with, from leaking out. The exterior seal 65 is simplified and the abutting portion of the axial lip 67a is formed to have a circular arc shape. When the wheel hub 1 or the outer joint member 14 is deformed due to a heavy moment load imposed on it, the exterior seal 65 can follow that deformation appropriately, making it possible to obtain high sealing performance.

FIG. 26 is an enlarged view of the principal portion showing another modified example of the exterior seal described above. It is noted that such components and parts that find their identical or functionally equivalent counterparts in the embodiment described above are identified with the same reference numerals, and a detailed description will be omitted.

This exterior seal 68 includes a cylindrical metal core 69 and a seal member 70. The cylindrical metal core 69 is press-fit onto the outside diameter of the shoulder portion 19 of the outer joint member 14. The seal member 70 is integrally bonded to the metal core 69 by cure adhesion or the like. The seal member 70 is made of synthetic rubber such as ACM or NBR. The seal member 70 has a side lip 70a, sidlingly extending radially outward, and a radial lip 70b, sidlingly extending radially inward. The side lip 70a makes elastic contact with the side face of an upstanding portion 74b of a slinger 74, forming an inner side seal 12. The radial lip 70b makes elastic contact with the outside diameter of the inner ring 5.

The inner side seal 12 is formed as a so-called pack seal. It includes a ring-shaped seal plate 73 and a slinger 74, with a substantially L-shaped cross-sectional shape. The seal plate 73 includes a metal core 71 fit into the end of the outer member 7. The metal core 71 has a substantially L-shaped cross-sectional shape. A seal member 72 is integrally bonded to the metal core 71 by cure adhesion. The slinger 74 includes a cylindrical part 74a, press-fit onto the outside diameter of the inner ring 5, and an upstanding portion 74b, extending from the cylindrical part 74a radially outward.

The seal member 72 is made of synthetic rubber such as NBR. The seal member 72 has a side lip 72a that makes sliding contact with the upstanding portion 74b of the slinger 74 with a predetermined axial interference left between them. A grease lip 72b and an intermediate lip 72c are formed into a bifurcated shape. The grease lip 72b and the intermediate lip 72c make sliding contact with the cylindrical part 74a, with a predetermined radial interference left between them.

By adopting such a structure, it is possible to prevent foreign matter, from the outside, such as rainwater and dust, from entering the engaging portion of the face splines 19a and 13a. The seal prevents grease, that the engaging portion is filled with, from leaking out. Furthermore, since the exterior seal 68 has the side lip 70a in contact with the slinger 74, it is possible to prevent foreign matter such as rainwater and dust from entering the bearing through a fit portion between the slinger 74 and the inner ring 5, and thereby increase the durability of the bearing.

FIG. 27 is a longitudinal section view of an eleventh embodiment of the driving wheel bearing apparatus. This embodiment has the same basic structure as the second embodiment (FIG. 4) described earlier and differs from the tenth embodiment (FIG. 21) basically only in the structure of the double row rolling bearing. Therefore such components and parts that find their identical or functionally equivalent counterparts in the embodiments described above are identified with the same reference numerals, and a detailed description will be omitted.

A double row rolling bearing 23 includes an outer member 7, an inner member 24, and double row rolling elements 9 and 9. The inner member 24 includes a wheel hub 22 and an inner ring member 25 fit into the wheel hub 22.

In this embodiment, an exterior seal 59 is mounted on a shoulder portion 19 of an outer joint member 14. Side lips 61a and 61b of the exterior seal 59 make elastic contact with a step portion 28 of the inner ring member 25. Thus, it seals an engaging portion of face splines 19a and 25a.

This makes it possible to prevent foreign matter, from the outside, such as rainwater and dust, from entering the engaging portion of the face splines 19a and 25a. The seal prevents grease, that the engaging portion is filled with, from leaking out. Thus, this prevents the face splines 19a and 25a from corroding or wearing.

FIG. 28 is a longitudinal section view of a twelfth embodiment of the driving wheel bearing apparatus. This embodiment has the same basic structure as the third embodiment (FIG. 6) described earlier and differs from the tenth embodiment (FIG. 21) basically only in the structure of the double row rolling bearing. Therefore, such components and parts that find their identical or functionally equivalent counterparts in the embodiments described earlier are identified with the same reference numerals, and a detailed description will be omitted.

A double row rolling bearing 31 includes an outer member 7, an inner member 32, and double row rolling elements 9 and 9. The inner member 32 includes a wheel hub 30 and an inner ring member 33 fit into the wheel hub 30 and secured via a predetermined interference.

The inner ring member 33, including a face spline 25a, is formed by cold forging or hot forging. However, thermal refining (high-temperature tempering after quenching) may be performed on the inner ring member 33 after it is forged. By performing thermal refining, it is possible to ensure low hardness and high toughness.

In this embodiment, an exterior seal 59 is mounted on a shoulder portion 19 of an outer joint member 14. Side lips 61a and 61b of the exterior seal 59 make elastic contact with a step portion 28 of the inner ring member 33. Thus, it seals an engaging portion of the face splines 19a and 25a.

This makes it possible to prevent foreign matter, from the outside, such as rainwater and dust, from entering the engaging portion of the face splines 19a and 25a. Also, the seal prevents grease, that the engaging portion is filled with, from leaking out. Thus, it prevents the face splines 19a and 25a from corroding or wearing.

A driving wheel bearing apparatus can be applied to a driving wheel bearing apparatus where a double row rolling bearing has a wheel hub and a constant velocity universal joint that are detachably unitized.

Although the embodiments of the present disclosure have been described, it is to be understood that the embodiments of the present disclosure are by way of illustration and example only and are not to be taken by way of limitation, and the present disclosure may be practiced in any other manner than specifically described above, with any modifications or variations made within the spirit of the present disclosure. The scope of the present disclosure is recited in the appended claims, and includes any modifications and variations made in the sense and within the scope equivalent to what is recited in the claims.

What is claimed is:

1. A driving wheel bearing apparatus having a double row rolling bearing and a constant velocity universal joint that are detachably unitized, the apparatus comprising:

the double row rolling bearing including an outer member with a body mounting flange to be mounted on a car body, the body mounting flange is integrally formed on the outer circumference of the outer member, the outer member is integrally formed with double row outer raceway surfaces on its inner circumference;

an inner member including a wheel hub and an inner ring, the wheel hub includes a wheel mounting flange for mounting a wheel, the wheel mounting flange is integrally formed at one end of the wheel hub, one inner raceway surface formed on the outer circumference of the wheel hub, the one inner raceway surface is arranged opposite to one of the double row outer raceway surfaces, a cylindrical portion axially extending from the inner raceway surface, the inner ring is press-fit onto the wheel hub, the inner ring including another inner raceway surface formed on its outer circumference, the other inner raceway surface arranged opposite to the other double row outer raceway surface;

a double row rolling element is freely rollably contained between the raceway surfaces of the inner member and the outer member;

an end of the cylindrical portion before caulking is formed as a hollow cylindrical part, an annular groove with a predetermined depth, is formed on an outer circumference surface of the cylindrical part from a position corresponding to a larger diameter end of the inner raceway surface of the inner ring to a position beyond a larger end face of the inner ring, and an end of the cylindrical part is plastically deformed so that part of the annular groove is brought into intimate contact with a chamfered portion of the inner ring, and the remaining part does not make contact with the inner ring leaving a space;

the inner ring is secured to the wheel hub by a caulked portion, the caulked portion is formed by plastically deforming an end of the cylindrical portion radially outward;

the constant velocity universal joint has an outer joint member having a cup-shaped mouth portion, a shoulder portion, forming the bottom of the mouth portion, and a cylindrical shaft portion, axially extending from the shoulder portion, the shaft portion has an internal thread, the mouth portion, the shoulder portion, and the shaft portion are integrally formed in the outer joint member;

face splines are formed at the respective end faces of the shoulder portion of the outer joint member and the caulked portion, the face splines are supported with pressure by a fastening bolt that abuts an outer side end face of the wheel hub and is threadedly connected to the internal thread of the shaft portion, and the double row rolling bearing and the constant velocity universal joint are coupled together in such a way that the double row rolling bearing and the constant velocity universal joint can transmit torque and are axially separable; and compressive remaining stress is placed on the surfaces of the face splines as a result of surface modification.

2. The driving wheel bearing apparatus according to claim 1, wherein the face spline of the caulked portion is formed by plastic deformation while the caulked portion is formed.

3. The driving wheel bearing apparatus according to claim 1, wherein the surface hardness of the face spline is set at 300 Hv or more.

4. The driving wheel bearing apparatus according to claim 1, wherein the surface of the face spline is subjected to shot peening or WPC as the surface modification.

5. The driving wheel bearing apparatus according to claim 1, wherein laser hardening is performed on the surface of the face spline.

6. The driving wheel bearing apparatus according to claim 1, wherein the annular groove is formed in an area ranging from a position corresponding to the larger diameter end of the inner raceway surface of the inner ring to the chamfered portion on the larger end face side, the area that spreads over the larger end face.

7. The driving wheel bearing apparatus according to claim 1, wherein the bottom of the annular groove is formed as a tapered face having a diameter which gradually decreases toward the tip of the cylindrical part, and an angle of inclination of the tapered face is set at 15° or less.

8. The driving wheel bearing apparatus according to claim 1, wherein circular arc surfaces, having radii of curvature Ri and Ro, are formed on the sides of the annular groove, and the radius of curvature Ri of the inner side circular arc surface of the circular arc surfaces is smaller than the radius of curvature Ro of the outer side circular arc surface (Ri≦Ro) and is set within a range of R1 to 10.

9. The driving wheel bearing apparatus according to claim 1, wherein a chamfered portion, having a circular arc surface with a radius of curvature, is formed at an inside diameter end on the larger end face side of the inner ring, and the radius of curvature of the chamfered portion is set within a range of R1.0 to 2.5.

10. The driving wheel bearing apparatus according to claim 1, wherein the depth of the annular groove is set at a depth of 0.5 to 2.0 mm.

11. The driving wheel bearing apparatus according to claim 1, wherein a hardened layer is formed in the cylindrical portion of the wheel hub by high frequency induction quenching to have a surface hardness of 50 to 64 HRC, and an inner side edge of the hardened layer is placed within an area from an outer side starting point in the annular groove to 0 to 4.0 mm on the outer side, and, on the inner side, to 0 to 3.0 mm in an area of an outer side circular arc surface of the annular groove.

* * * * *

UNITED STATES PATENT AND TRADEMARK OFFICE
CERTIFICATE OF CORRECTION

PATENT NO. : 8,100,775 B2  
APPLICATION NO. : 12/959633  
DATED : January 24, 2012  
INVENTOR(S) : Isao Hirai et al.

Page 1 of 1

It is certified that error appears in the above-identified patent and that said Letters Patent is hereby corrected as shown below:

Column 10  
Line 16, after "hub", insert --(1)--.

Column 11  
Line 43, "1a" should be --1a--.

Column 15  
Lines 66-67, "microc-racks" should be --micro-cracks--.

Signed and Sealed this  
Third Day of July, 2012

David J. Kappos  
*Director of the United States Patent and Trademark Office*